(12) United States Patent
Jain et al.

(10) Patent No.: US 10,826,941 B2
(45) Date of Patent: Nov. 3, 2020

(54) SYSTEMS AND METHODS FOR CENTRALLY MANAGED HOST AND NETWORK FIREWALL SERVICES

(71) Applicant: Fortinet, Inc., Sunnyvale, CA (US)

(72) Inventors: Anurag Jain, Edison, NJ (US);
Kenneth Ammon, Leesburg, VA (US);
Thomas Cross, Atlanta, GA (US);
Michael C. Starr, Reston, VA (US)

(73) Assignee: Fortinet, Inc., Sunnyvale, CA (US)

( * ) Notice: Subject to any disclaimer, the term of this patent is extended or adjusted under 35 U.S.C. 154(b) by 288 days.

(21) Appl. No.: 16/023,388

(22) Filed: Jun. 29, 2018

(65) Prior Publication Data

US 2019/0349404 A1 Nov. 14, 2019

Related U.S. Application Data

(60) Provisional application No. 62/669,544, filed on May 10, 2018.

(51) Int. Cl.
*H04L 29/06* (2006.01)

(52) U.S. Cl.
CPC .......... *H04L 63/20* (2013.01); *H04L 63/0245* (2013.01); *H04L 63/10* (2013.01)

(58) Field of Classification Search
CPC ........ H04L 63/20; H04L 63/10; H04L 63/101
See application file for complete search history.

(56) References Cited

U.S. PATENT DOCUMENTS

| 7,441,022 | B1 * | 10/2008 | Schuba | ............... H04L 41/5025 |
| | | | | 706/47 |
| 8,001,610 | B1 | 8/2011 | Chickering et al. | |
| 8,281,363 | B1 | 10/2012 | Hernacki et al. | |
| 9,197,601 | B2 | 11/2015 | Pasdar | |
| 9,935,984 | B1 * | 4/2018 | Castilho | .................. G06F 21/57 |
| 10,147,076 | B2 * | 12/2018 | Zhou | ........................ G09C 5/00 |

(Continued)

OTHER PUBLICATIONS

International Search Report and Written Opinion dated Jun. 28, 2019, directed to International Application No. PCT/US2019/031564; 15 pages.

(Continued)

*Primary Examiner* — Ponnoreay Pich
(74) *Attorney, Agent, or Firm* — Jaffery Watson Mendonsa & Hamilon LLP

(57) ABSTRACT

A method for protecting an enterprise network includes, at a system that is remote from the enterprise network: controlling communications to and from the enterprise network according to a set of security policies; controlling endpoint to endpoint connections within the enterprise network according to the set of security policies; receiving a request for modifications to the set of policies; automatically generating a policy digest formatted according to a predefined format, the policy digest comprising the modifications, and storing the policy digest in the memory; retrieving the policy digest from the memory; generating one or more calls to one or more system components that control the communications to and from the enterprise network and the endpoint to endpoint connections based on the policy digest; and modifying control of the communications and the endpoint to endpoint connections based on the one or more calls.

22 Claims, 12 Drawing Sheets

(56) References Cited

U.S. PATENT DOCUMENTS

| | | | |
|---|---|---|---|
| 10,163,135 B2 | 12/2018 | Ben-Rubi | |
| 2002/0069200 A1* | 6/2002 | Cooper | H04L 41/22 |
| 2002/0112155 A1* | 8/2002 | Martherus | H04L 63/0815 |
| | | | 713/155 |
| 2003/0135603 A1 | 7/2003 | Lin | |
| 2004/0107360 A1* | 6/2004 | Herrmann | H04L 63/08 |
| | | | 726/1 |
| 2006/0212524 A1 | 9/2006 | Wu et al. | |
| 2008/0040790 A1 | 2/2008 | Kuo | |
| 2008/0267201 A1 | 10/2008 | Yang | |
| 2010/0020567 A1 | 1/2010 | Tatehata et al. | |
| 2010/0205657 A1 | 8/2010 | Manring et al. | |
| 2012/0047483 A1 | 2/2012 | Amit et al. | |
| 2013/0269023 A1 | 10/2013 | Dilley et al. | |
| 2014/0237584 A1 | 8/2014 | Cooper et al. | |
| 2016/0323318 A1* | 11/2016 | Terrill | H04L 63/0227 |
| 2016/0330183 A1 | 11/2016 | McDowell et al. | |
| 2017/0289271 A1 | 10/2017 | Seed et al. | |
| 2019/0068649 A1 | 2/2019 | Terrill et al. | |
| 2019/0349404 A1* | 11/2019 | Jain | H04L 63/0272 |

OTHER PUBLICATIONS

Extended European Search Report dated Sep. 19, 2018, directed to EP Application No. 16787310.8; 13 pages.

International Search Report and Written Opinion dated Jul. 28, 2016, directed to International Application No. PCT/US2016/030463; 14 pages.

Terrill et al., U.S. Office Action dated Feb. 7, 2018, directed to U.S. Appl. No. 15/144,702; 20 pages.

Terrill et al., Office Action dated Apr. 18, 2019, directed to U.S. Appl. No. 16/174,572; 13 pages.

* cited by examiner

```
                "name": "eMSP - AcmePlus",
1402 ~      "sites":
                "id": 432,
                "location_type": "Branch Office",
                "street_address": "123 Main Ave",
                "city": "Los Angeles",
                "siteprovider_set":
                    "id":130,
                    "name": "COX",
                    "ip_address": "10.10.10.62",
                    "gateway_ip_address": "10.10.10.61",
                    "bandwidth_up": 20,
                    "bandwidth_down" :100,
                "connection_type_name": "VPN Device",
                "user_count": 30, 1408 ——   "zones":
                "id": 455,
                "name": "FINANCE-SERVERS", 1404 ——   "devices":
                "id": 632,
                "name": "WEB SERVER_PUBLIC",
                "ip_address": "172.16.176.134",
                "internet_accessible": true 1406 ——   "domains":
                "id": 236,
                "ddos_protection": true,
                "host_port":
                    "id": 267,
                    "id": 632

1410 ——   "inbound policies":
                "id": 166,
                "policy_type": 20,
                "servers": "id": 632
                "ports":
                    "protocol": "TCP",
                    "port": "80"

1412 ——   "securitycontrols":
                "anti_virus": true,
                "anti_spyware": true,
                "url_filtering": true,
                "file_blocking": true, "zone_policies": —— 1414
                                                  "id": 173,
                                                  "policy_type": 20,
                                                  "destination_zones": 461
                                                  "source_zones": 461
                                                  "all_source_zones": false,
                                                  "ports":
                                                      "protocol": "TCP",
                                                      "port": "135"
                                                      "protocol": "TCP",
                                                      "port": "445"
                                                      "protocol": "TCP",
                                                      "port": "3389"
                                                      "protocol": "UDP",
                                                      "port": "3389"
                                                  "action": 20,
                                                  "special_policy_type": 40

"id": 171,
                                                  "policy_type": 20,
                                                  "detination_zones": 461
                                                  "source_zones": 461
                                                  "all_source_zones": false,
                                                  "groups": "HelpDesk, Patch_Mgmt,SOC,Domain Admin"
                                                  "ports":
                                                      "protocol": "TCP",
                                                      "port": "3389"
                                                      "protocol": "UDP",
                                                      "port": "3389"
                                                  "action": 10,
                                                  "special_policy_type": 40

"url_filters": —— 1416
                                                  "id": 29,
                                                  "name": "Strict",
                                                  "allowed_categories":
                                                      "auctions",
                                                      "business-and-economy",
                                                      "computer-and-internet-info",
```

FIG. 4C

SYSTEMS AND METHODS FOR CENTRALLY MANAGED HOST AND NETWORK FIREWALL SERVICES

CROSS-REFERENCE TO RELATED APPLICATIONS

This application claims the benefit of U.S. Provisional Application No. 62/669,544, filed May 10, 2018, the entire contents of which are incorporated herein by reference.

FIELD OF THE INVENTION

This invention relates generally to computer networking and, specifically, to computer network security.

BACKGROUND OF THE INVENTION

Traditional enterprise network security relies on using firewalls to provide security at network perimeters. These enterprise networks often have a hub-and-spoke architecture where satellite offices and remote users "VPN in" to a main corporate office where corporate applications are hosted. As workforces have become more distributed, and corporate applications have begun to move out of the main corporate office into the cloud, this architecture has become inefficient and unreliable because traffic is forced to flow through the main office on its way between end users and corporate applications, sometimes "hair-pinning" across the same network link multiple times.

Simply moving firewalls out of corporate offices and into the cloud is not sufficient to solve this problem by itself. Attackers have proven that they are able to get in "behind the firewall" where they can spread their attacks within the enterprise network with relative impunity. Network firewalls are often used to provide segmentation within internal networks that helps stop the spread of attacks. When firewalls are moved out of corporate networks and into the cloud, the ability to see and control internal network traffic can be lost.

Exacerbating these problems is the management complexity of enterprise network firewalls. Any non-trivial implementation becomes increasingly complex as an enterprise grows, leading to different firewalls of different makes, models, and patch levels in different parts and layers of these complex networks. Each firewall may have its own user interface, security policy, domain of knowledge, API, and group of subject matter experts (SMEs) who manage it. Often these firewalls are not operating in their most secure posture, due to "quick rules" being added over time and never removed, and being managed by part-time administrators.

SUMMARY OF THE INVENTION

According to some embodiments, a cloud managed virtual security perimeter protects enterprise networks regardless of where the network resources are located on the Internet. Virtualized, cloud-based network firewalls, are combined with software defined network segmentation capability on each endpoint of the enterprise network, and the virtual firewalls and network segmentation modules are managed from a central management system that customers can use to set a single, unified security policy that applies to the enterprise network.

According to some embodiments, a method for protecting an enterprise network, includes, at a system comprising one or more processors and memory that are remote from the enterprise network: controlling communications to and from the enterprise network according to a set of security policies; controlling endpoint to endpoint connections within the enterprise network according to the set of security policies; receiving a request for modifications to one or more policies of the set of policies; automatically generating a policy digest formatted according to a predefined format, the policy digest comprising the modifications, and storing the policy digest in the memory; retrieving the policy digest from the memory; generating one or more calls to one or more system components that control the communications to and from the enterprise network and the endpoint to endpoint connections based on the policy digest; and modifying control of the communications to and from the enterprise network and the endpoint to endpoint connections based on the one or more calls.

In any of these embodiments, the request for modifications can be based on selections made by a user via a user interface. In any of these embodiments, the communications for the enterprise network can be routed through one or more perimeter points of presence and the one or more calls can be one or more calls for modification of a security stack implemented by the one or more perimeter points of presence.

In any of these embodiments, the policy digest can include one or more of an inbound network traffic policy modification, an outbound network traffic policy modification, and an internal network traffic policy modification. In any of these embodiments, the policy digest can be retrieved according to a predefined schedule.

In any of these embodiments, the policy digest can be retrieved by a daemon service that generates the one or more calls to the one or more system components. In any of these embodiments, the policy digest can be stored in a memory location for a portal process and the daemon service can initiate a connection to the portal process for retrieving the policy digest.

In any of these embodiments, the portal process can be prevented from initiating a connection with the daemon service. In any of these embodiments, prior to generating one or more calls to one or more system components, the policy digest can be checked for adherence to the predefined format.

In any of these embodiments, controlling endpoint to endpoint connections can include receiving connection escalation requests from endpoint agents and replying to the connection escalation requests with responses that include actions for handling connections that are based on the set of policies.

In any of these embodiments, a connection escalation request can include a request from an endpoint agent running on a first endpoint of the enterprise network for approval to accept a connection request from a second endpoint and a response can include an instruction to the first endpoint to accept or deny the connection request from the second endpoint of the enterprise network.

According to some embodiments, a system for protecting an enterprise network that is remote from the system includes one or more processors, memory, and one or more programs stored in the memory and executable by the one or more processors for: controlling communications to and from the enterprise network according to a set of security policies; controlling endpoint to endpoint connections within the enterprise network according to the set of security policies; receiving a request for modifications to one or more policies of the set of policies; automatically generating a policy digest formatted according to a predefined format, the policy digest comprising the modifications, and storing the policy digest in the memory; retrieving the policy digest from the memory; generating one or more calls to one or more system components that control the communications to and from the enterprise network and the endpoint to endpoint connections based on the policy digest; and modifying control of the communications to and from the enterprise network and the endpoint to endpoint connections based on the one or more calls.

In any of these embodiments, the request for modifications can be based on selections made by a user via a user interface. In any of these embodiments, the communications for the enterprise network can be routed through one or more perimeter points of presence and the one or more calls can be one or more calls for modification of a security stack implemented by the one or more perimeter points of presence.

In any of these embodiments, the policy digest can include one or more of an inbound network traffic policy modification, an outbound network traffic policy modification, and an internal network traffic policy modification. In any of these embodiments, the policy digest can be retrieved according to a predefined schedule.

In any of these embodiments, the policy digest can be retrieved by a daemon service that generates the one or more calls to the one or more system components. In any of these embodiments, the policy digest can be stored in a memory location for a portal process and the daemon service can initiate a connection to the portal process for retrieving the policy digest.

In any of these embodiments, the portal process can be prevented from initiating a connection with the daemon service. In any of these embodiments, prior to generating one or more calls to one or more system components, the policy digest can be checked for adherence to the predefined format.

In any of these embodiments, controlling endpoint to endpoint connections can include receiving connection escalation requests from endpoint agents and replying to the connection escalation requests with responses that comprise actions for handling connections that are based on the set of policies.

In any of these embodiments, a connection escalation request can include a request from an endpoint agent running on a first endpoint of the enterprise network for approval to accept a connection request from a second endpoint and a response can include an instruction to the first endpoint to accept or deny the connection request from the second endpoint of the enterprise network.

BRIEF DESCRIPTION OF THE DRAWINGS

The invention will now be described, by way of example only, with reference to the accompanying drawings, in which:

FIG. 4C is an exemplary policy digest, according to one embodiment;

DETAILED DESCRIPTION OF EXEMPLARY EMBODIMENTS

Figure 1:
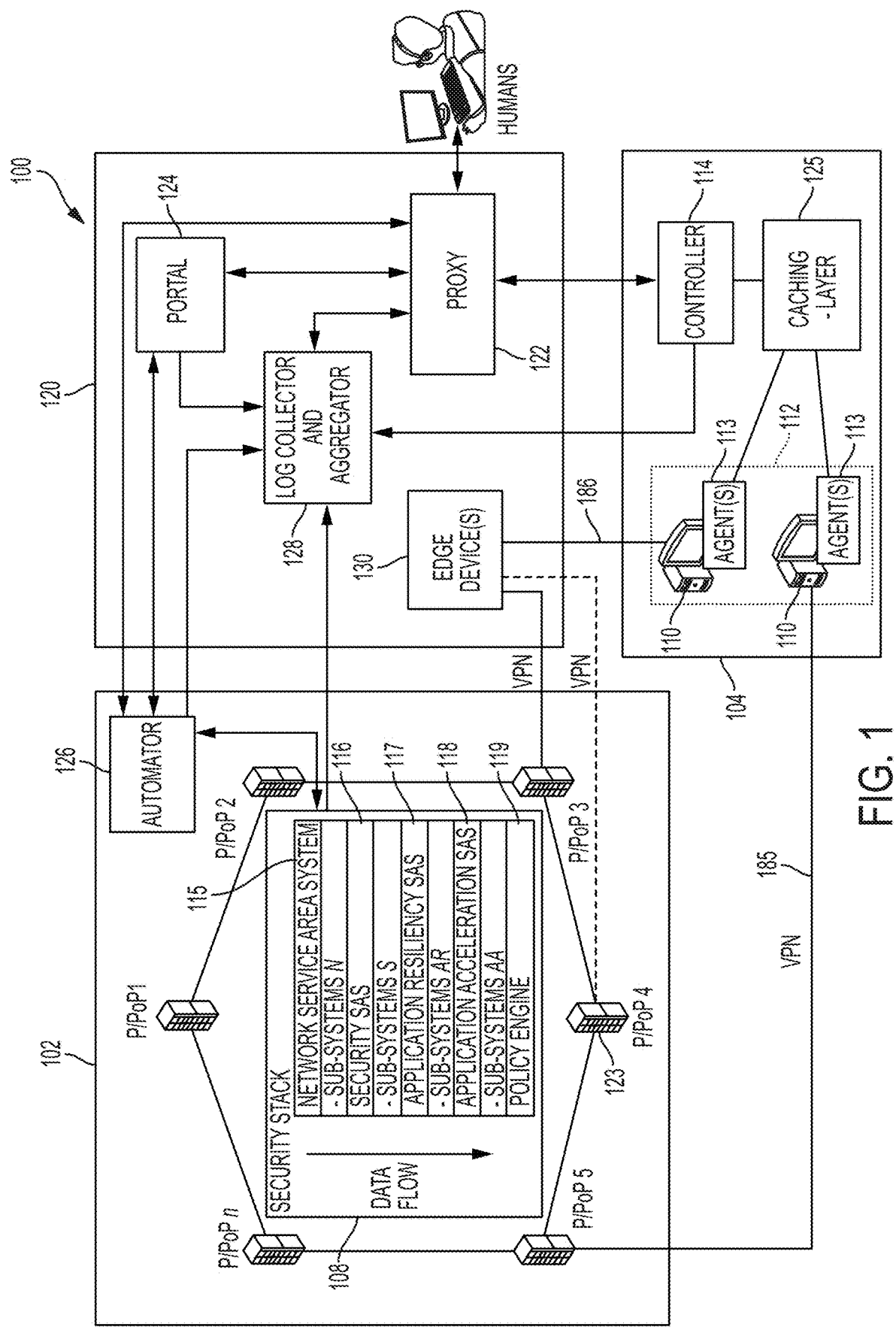
FIG. 1 is an architectural view of a centrally managed host and network firewall and network segmentation provided as a service, according to one embodiment.

According to some embodiments, network systems and methods provide a unified, cloud-managed platform for controlling enterprise network security. Network firewalls may be virtualized and moved out of, for example, corporate offices and into the cloud where they can be elastically provisioned and remotely managed. This deployment paradigm helps to create a virtual perimeter controlling traffic flowing between sites anywhere on the global Internet without introducing unnecessary traffic backhaul or inefficiencies.

Network segmentation software agents may be introduced into each endpoint system to provide granular visibility into and control over all traffic happening "behind the firewall." This segmentation software can connect with a controller that is hosted in the cloud, alongside the virtualized network firewalls. This can provide a "software-only" security infrastructure that can protect networks as well as hosts.

According to some embodiments, a single central management console in the cloud can provide a unified view of the states of the virtual perimeter and network segmentation software agents and a unified security policy. Enterprise users may be able to define a single security policy reflecting the business requirements of their organization, and the system will automatically enforce that policy using virtualized network firewalls and endpoint segmentation software where appropriate, without requiring users to explicitly determine where each rule in the policy should be enforced or what technology should do the enforcement.

Accordingly, systems and methods described herein can allow for central configuration and management of a plurality of discrete yet coordinated firewalls and other network security systems and sub-systems "in the cloud" which effectively provides for Firewall-as-a-service (FWaaS) and, more broadly, Network Security-as-a-Service (NSaaS) capability which would not have been possible before. Customers who adopt this system can remove all legacy hardware firewall and network security devices from their networks, and well as any hardware VLAN segmentation. They can define their security policy in a single location at the level of their business requirements without having to understand the architecture of the underlying enforcement systems. Their networks are protected behind a virtual perimeter, and each enterprise endpoint system has a firewall around itself by virtue of the software defined network segmentation.

In the following description of the disclosure and embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware and, when embodied in software, could be downloaded to reside on and be operated from different platforms used by a variety of operating systems.

The present invention also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Figure 2:
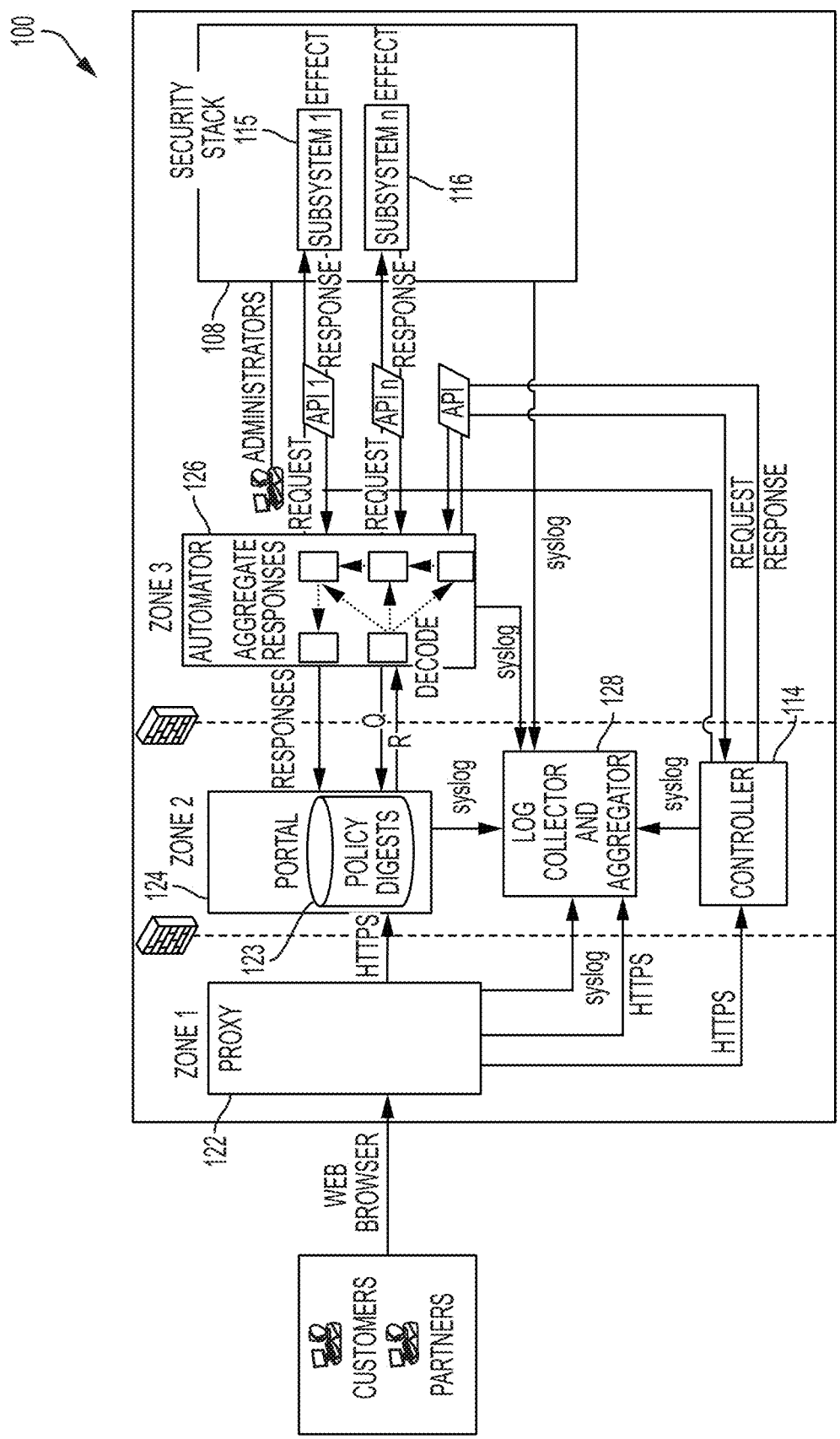
FIG. 2 is a security zone view of the centrally managed host and network firewall and network segmentation provided as a service of FIG. 1.

FIGS. 1 and 2 illustrate a system 100, according to one embodiment, for central configuration and management of a plurality of cloud-based firewalls and other network security systems and sub-systems. FIG. 1 provides an architectural view of system 100 and FIG. 2 provides a security zone view of system 100. System 100 includes a virtual perimeter 102, a network segmentation subsystem 104, and central manager 120 for central management of the virtual perimeter 102 and network segmentation subsystem 104.

Virtual Perimeter

Virtual perimeter 102 is configured to provide virtual firewall services for the computing nodes of an enterprise network. A virtual perimeter according to some embodiments is described in more detail in U.S. Pat. No. 9,197,601, entitled SYSTEM AND METHOD FOR PROVIDING A SINGLE GLOBAL BORDERLESS VIRTUAL PERIMETER THROUGH DISTRIBUTED POINTS OF PRESENCE, which is hereby incorporated by references in its entirety. Virtual perimeter 102 provides virtualized network firewalls in the cloud where they can be elastically provisioned. This deployment paradigm helps to create a virtual perimeter controlling traffic flowing between sites anywhere on the global Internet without introducing unnecessary traffic backhaul or inefficiencies.

Virtual perimeter 102 can leverage a variety of connection types across public and private networks to deliver a virtual perimeter for various computing endpoints 110 (also referred to herein as endpoints) within an enterprise network 112. As shown in FIG. 1, the system comprises one or more Perimeter Points of Presence (P/PoP) 121 that can be geographically distributed, for example, across multiple buildings, cities, regions, countries, and continents. The P/PoPs 121 are physically or virtually connected with a plurality of computing endpoints 110 for an enterprise network 112 associated with a customized virtual perimeter 102. Examples of such computing endpoints 110 include, but are not limited to, Application-as-a-Service platforms (AaaS), office computers, data centers, cloud instances (including public cloud instances, private cloud instances, hybrid cloud instances), mobile devices, a remote users, software-as-a-service platforms (SaaS), and other computing endpoints (also referred to as nodes or hosts), some or all of which can be geographically and functionally distributed.

P/PoPs 121 are virtually or physically connected with computing endpoints 110 of the enterprise network associated with a customized virtual perimeter 102. Computing endpoints 110 can connect with a P/PoP 121 via either a direct virtual connection 185 or through a connection 186 to an edge device 130, as is discussed further below. Access to untrusted or unknown entities, which provide untrusted data flow to computing endpoints 110, such as via the Internet, third parties, and other untrusted entities, is physically or virtually, and either directly or indirectly, connected with a P/PoP 121. As used herein, untrusted or unknown refers to entities, platforms, nodes or other data sources or destinations that are beyond the organizational control of an entity associated with a virtual perimeter.

The P/PoPs 121 can each include a plurality of selectable service area systems in a security stack 108, each of which can comprise one or more selectable service area subsystems. Together, the selectable service area systems and sub-systems can provide a customized virtual perimeter for an enterprise network. The one or more P/PoPs 121 are configured to receive data, process the data using at least one of the service area systems and/or sub-systems configured as a data processing policy for the enterprise network, and transmit the processed data as policy compliant data from the one or more P/PoP 121 to an end destination. Examples of selectable service area systems include network service area system 115, security service area system 116, application resiliency and availability service area system 117, and an application acceleration service area system 118. As can be readily understood by one of ordinary skill in the art, the systems and subsystems process both inbound and outbound data flows in both directions.

The P/PoPs 121 include a policy engine 119 enabling policies to be defined for each system and sub-system. These policies, which comprise, for example, Trigger(s), Function(s), Action(s) and Event Record sections, are applied to each applicable system and sub-system. Once the policies are applied, the systems, and sub-systems within each P/PoP will behave accordingly to support or not support the processing of flows. A policy may utilize one or a plurality P/PoPs depending on organizational requirements including for the purposes of redundancy, geographically distributed communications, application acceleration or other purposes. A single policy maybe comprised of a uniform (consistent) policy for all distributed P/PoPs or a policy may utilize different functionality or different policy elements at disparate P/PoPs to support disparate source or destination nodes with varying policy requirements. Different policies or policy elements for a single policy may be applied at multiple P/PoPs. Thus Trigger(s), Function(s), Action(s) and Event Record sections for a single policy can be distributed across multiple P/PoPs, such that, for example, a Function can be executed by one P/PoP and the Action for that Function can be executed by one or more other P/PoP.

Network Segmentation Subsystem

Network segmentation subsystem 104 provides software defined network segmentation that may be provided at each endpoint 110 of a customer's network. Network segmentation agents 113 are introduced onto each endpoint to provide granular visibility into and control over all traffic happening "behind the firewall." This segmentation software connects with a network segmentation controller 114 that is hosted in the cloud, alongside the virtualized network firewalls—i.e., by one or more of the P/PoPs 121. The result is a "software-only" security infrastructure that can protect networks as well as hosts. According to some embodiments, the virtual perimeter 102 together with the network segmentation subsystem 104 surrounds an enterprise network with a secure virtual perimeter and protects each individual host within that network as well.

A system for software defined network segmentation, according to some embodiments and aspects of some embodiments, is discussed in more detail in U.S. patent application Ser. No. 15/144,702, entitled COMPUTER NETWORK SECURITY SYSTEM, the entire contents of which are hereby incorporated by reference. Generally, each endpoint 110 is configured to operate a network segmentation agent 113, which can be a software application that monitors and gates host communications based on rules and instructions provided by a network segmentation controller 114. The network segmentation controller 114, which is configured to control and manage the endpoint agents, can be a stand-alone service operating in the cloud that receives data from network segmentation agents 113 as connections are initiated. The network segmentation controller 114 can be implemented as one or more software applications executing on one or more hardware servers, hosts or other computers remote from the enterprise network 112. For example, in some embodiments, the network segmentation controller operates on one or more P/PoPs 121.

The network segmentation controller 114 can be configured to provide dynamic control of network segmentation agents 113 so that requests for network connections to or from any endpoint 110 by other endpoints on the enterprise network and/or from outside the enterprise network can be analyzed by the controller and responded to on the fly, in real-time, as will be discussed in further detail below. The controller 114 can also be configured to request or gather status reports from endpoints 110 in order to maintain a map and/or log of various resources operating on the network, as will be discussed in further detail, below. The network segmentation controller 114 can further be configured, in conjunction with the network segmentation agents 113, to enforce enhanced authentication policies, as will be discussed in more detail below. Additional functionality that can be supported by the controller 114 will also be discussed below.

The network segmentation subsystem 104 can provide network administrators with increased visibility into their internal corporate network as well as improved management and control over that network so that segmentation can be performed at a more fine-grained level and at a lower cost. In accordance with certain embodiments, the granularity of control achieved can be described as dynamic micro-segmentation, since communications between any two hosts, both on the sending and receiving sides, can be dynamically monitored and gated. The network segmentation subsystem 104 can be configured, in effect, to create a virtual overlay of separate network segments within existing enterprise networks, which enables greater security benefits than traditional networking equipment such as firewalls, switches, and routers.

The functionality of the network segmentation agent 113 differs substantively from a local or host-based firewall in how it interacts with connections and receives policy. Local firewalls typically have local policy that is set once with minimal changes over time. The network segmentation agent 113, on the other hand, first checks metadata for new connection requests against a local cache of rules. If a temporarily or permanently cached rule applies, the agent handles the connection in accordance with the cached rule, such as by allowing or blocking the connection. If no entry applies, however, the network segmentation agent 113 sends the metadata to the network segmentation controller 114, e.g., running on a P/PoP 121, in a connection escalation request to see if the controller 114 approves of the new connection based on an applicable rule or policy, such as one cached in a caching-layer 125, while the network segmentation agent 113 holds the connection request, pending a response from the controller 114.

In some embodiments, a network segmentation agent 113 may establish a connection with the controller 114 implemented by one or more P/PoPs 121, e.g., by establishing a connection to the one or more P/PoPs 121 through a VPN connection 185 or through a connection 186 to an edge device 130. In some embodiments, this can mean that for each endpoint to endpoint connection within an enterprise network in which the endpoint agent(s) lack a locally cached rule, connection escalation requests (e.g., communications of metadata associated with the connection requests) are transmitted to a system remote from the enterprise network—the system (e.g., cloud base system) implementing the controller 114—which is also the system providing the virtual perimeter 102. Thus, the control of endpoint to endpoint connections within the enterprise network can be harmonized with the control of communications to and from the enterprise network.

In response to receiving the connection escalation request, the controller 114 can respond with a directive instructing the network segmentation agent 113 how to handle the connection request, such as to approve or deny the request. The controller 114 can also include with the response a rule applicable to the connection request to be cached for future use. Alternatively, the controller 114 can be configured to respond with an applicable rule for the network segmentation agent 113 to cache and apply to the connection request. The controller 114 can also indicate, when sending a rule, an amount of time for which the rule should be cached by the network segmentation agent 113. The amount of time can be determined universally, by groups of rules, or on a rule-by-rule basis and can be configurable by an administrator, determined based on an automated analysis or both.

The network segmentation agent 113 and network segmentation controller 114, accordingly, can be configured such that the network segmentation agent 113 monitors new connection requests to and from the respective host, comparing the connections to cached rules in a caching-layer 125 obtained from the controller 114, and holding new connections while escalating requests for applicable rules and/or directives to the controller 114 operating in the cloud—i.e., in one or more P/PoPs—in real-time when no applicable rules are available in their caches. The network segmentation subsystem 104, therefore, enables a global policy to be dynamically created, modified, and enforced in real-time. In some embodiments, unlike software defined network segmentation systems in which the controller is on-site with the endpoints being controlled or within the enterprise network being controlled, the systems described herein can implement the controller from a system that is remote from the enterprise network—i.e., in the cloud. This enables software defined network segmentation to be provided as a service along with the virtual perimeter described above and enables the two to be configured and reconfigured in a coordinated and synchronized fashion by a cloud-based central management platform, as described further below.

Central Management

Both the virtual perimeter 102 and the network segmentation subsystem 104 can be provisioned, deprovisioned, configured, and reconfigured according to the requirements of each customer via a central manager 120 that facilitates and automates such changes. Without this automation, every customer-requested configuration change, as well as the day-to-day operations of a network, would require systems administrators to launch privileged sessions into backend systems and perform risky and error-prone configuration changes. Because such non-automated changes would be made manually by people, the implementation timeline could vary, leaving the organization less agile and vulnerable to contemporary threats. Further, the intended purposes of the changes could be lost as part of the change request process, resulting in incorrect expression of a customer's intent. Further, a large pool of 24/7 administrators would be required which can be expensive and represents a large pool of insider threat, since the administrators all require privileges that can be misused either intentionally or accidentally. Further, configuration concepts can be shared between the virtual perimeter and network segmentation subsystems, including host groups, user groups, and network traffic policies, and maintaining this information in these multiple subsystems would be laborious without the automation provided by the central manager 120, which could result in inconsistent application of security policies.

Accordingly, system 100 includes central manager 120 for central configuration and management of the virtual perimeter 102 and the network segmentation subsystem 104. Central manager 120 comprises one or more applications, processes, daemon services, etc., executed by one or more processors of one or more computing resources, such as one or more servers. The computing resources may be cloud-based computing resources such that one or more of the central manager's functional components executes remotely from an enterprise network protected by a virtual perimeter managed by the central manager 120. The central manager 120 can be used to manage virtual perimeters and software-defined network segmentation for multiple related or unrelated enterprise networks. The central manager 120 can be accessed by users located within a protected enterprise network and/or located remotely from the enterprise network for configuring the enterprise network.

According to some embodiments, central manager 120 can include proxy 122, portal 124, automator 126, log collector 128, and edge devices 130. FIG. 1 shows the architectural layout of these components while FIG. 2 shows the zones of security within which each of these components operate.

The proxy 122 provides access control, audit, and other security services for the portal, log collector and aggregator, and network segmentation controller from the Internet. In some embodiments, the proxy 122 is configured to "horizontally scale" such that adding machines to the Proxy will have a linear expansion of the number of concurrent connections that can be serviced at once and that the "cluster" can survive one or more members failing.

The portal 124 serves as the single point of self-service configuration and management of the virtual perimeter 102 and network segmentation subsystem 104 for customers, end users, and partners. The portal 124 can include a user interface, a backend service, and an API service. The Portal can perform actions to service the user interface and the API, guide users through selecting a customer and making configuration and policy updates which are then queued locally and bulk transmitted to the automator 126 via a set of policy digests 123. The portal 124 can allow service providers to manage multiple customers, and can provide each customer with access to their own individual configurations. The portal 124 can be configured to "horizontally scale" such that adding machines to the portal 124 will have a linear expansion of the number of concurrent connections that can be serviced at once and that the "cluster" can survive one or more members failing.

The automator 126 is a set of daemon processes which can periodically retrieve and decode pending policy digests 123 from the portal 124 and execute individual virtual perimeter 102 and network segmentation subsystem 104 service area system and sub-system API calls corresponding to a translation of the policy digest 123 either sequentially or in parallel. The automator 126 is capable of provisioning new virtual perimeter 102 and network segmentation subsystems 104 to serve specific customer needs within the available virtual capacity. The automator 126 can adapt to situations where specific physical and virtual systems within the infrastructure are not working properly, either by postponing policy updates or moving configurations to different systems. The automator 126 has direct access to reconfigure security policies and network infrastructure. Accordingly, the automator 126 is protected from receiving connections from the Internet (either directly or through the proxy 122). Rather, the automator 126 retrieves policy digests 123 from the portal 124, which itself can be reached from the Internet via the proxy 122, but the portal 124 cannot connect directly to the automator 126. In some embodiments, the automator 126 is configured to "horizontally scale" such that adding machines to the automator 126 will have a linear expansion of the number of concurrent jobs that can be serviced at once, and that the "cluster" can survive one or more members failing.

The policy digest 123 is a structured representation of a set of user-requested changes to be made to the configuration of virtual Perimeter 102, network segmentation subsystem 104, and/or other supporting systems. These changes could involve adding, removing, or changing sites, policies, rules, or other system configuration aspects. Changes are selected through the portal 124 and automatically encoded into policy digests 123, according to a predefined format, and placed into a policy digest request queue, which is a database of policy digests within the portal 124.

The automator 126 retrieves and decodes these policy digests 123 into a set of actions, including individual API calls to be made on specific virtual perimeter and/or network segmentation components. This set of actions is serialized then executed, either serially or in parallel, against the virtual perimeter and/or network segmentation components, as well as the supporting systems and network infrastructure on which they run as appropriate. The result of this set of actions (success or failure) can be returned back to the portal 124 for eventual delivery back to the customer who requested the changes.

The log collector 128 receives logging events from the proxy 122, portal 124, automator 126, virtual perimeter 102 service area systems and sub-systems, and network segmentation subsystem 104 and stores those logs in a local database. The log collector 128 can execute one-time timeboxed queries against logs and events in the database and save them to be run again on-demand or via a scheduled job. According to some embodiments, the log collector 128 can include a user interface, which is accessed from the portal 124, a backend service, and/or an API service. In some embodiments, users can download and/or export results in various formats (e.g., screen/UI, CSV, PDF, etc.) In some embodiments, users can create, edit, clone, and/or delete dashboards in the log collector 128, which may include saved searches and visual elements such as bar charts, pie charts, line graphs, etc. The log collector 128 may have a set of built-in dashboards, such as Threats, Traffic, WAF, and Blocks. The log collector 128 can be deployed in a clustered, high availability configuration to provide fault tolerance and scalability.

The edge device 130 can be provided for connecting hosts in a remote location to a virtual perimeter. The edge device 130 is a physical device that can act as a router and VPN endpoint that creates an encrypted tunnel to a P/PoP 121 and aggregates network traffic to and from a remote location. Edge devices 130 may be connected singularly to a single P/PoP 121, and/or one or more edge devices 130 may be connected to multiple P/PoPs 121. Edge devices 130 can be delivered to the customer pre-configured such that all the customer needs to do is "rack and stack" the edge device, power it in, and begin routing all local network traffic via the edge device 130 to extend the virtual perimeter to the on-premises network. Endpoint agents can be provided in addition to or instead of physical edge devices and may be installed on endpoint computers so that they may connect into the customer's virtual perimeter 102, for example, via a VPN connection. Additionally, in some embodiments, the agent edge device can include the network segmentation agent 113 for the network segmentation subsystem 104, so the endpoint computer can be included in network segmentation subsystem.

The above components of central manager 120 are described in more detail in the following paragraphs.

Proxy

The proxy 122 is an Internet connected listening service that can receive and reply to incoming requests, for example, from users via their web browser. These requests may be implemented using different formats such as HTTP. The proxy 122 allows users to initiate connections to the portal 124, log collector 128, and/or network segmentation controller 114 of the network segmentation subsystem 104. In some embodiments, all communication is strongly encrypted. Proxy 122 can be deployed in a clustered, high availability configuration to provide fault tolerance and scalability.

In some embodiments, the proxy 122 contains an authentication, authorization, and auditing (AAA) engine and enforces some or all to some or all incoming connections. Incoming requests that users can send to the proxy 122 include a request to communicate with the portal 124. If a connection is permitted as per policy, the request is relayed to the portal 124, otherwise it is denied, and the result of the request may be logged locally and/or to the log collector 128. Another kind of incoming request that users may send to the proxy 122 is a request to communicate with the network segmentation controller 114 of the network segmentation subsystem 104. If a connection is permitted as per policy, the request is relayed to the network segmentation controller 114, otherwise it is denied, and the result of the request is logged locally and/or to the log collector 128. Another kind of incoming request that users may send to the proxy 122 is a request to communicate with the log collector 128. If a connection is permitted as per policy the request is relayed to the log collector 128, otherwise it is denied, and the result of the request is logged locally and/or to the log collector 128.

The proxy 122 may terminate active (and prevent future) requests upon policy or configuration changes affecting them. In some embodiments, the proxy 122 may include a Web Application Firewall (WAF), which provides protection against Denial of Service (DoS) and Distributed Denial of Service (DDoS) attacks.

Figure 3:
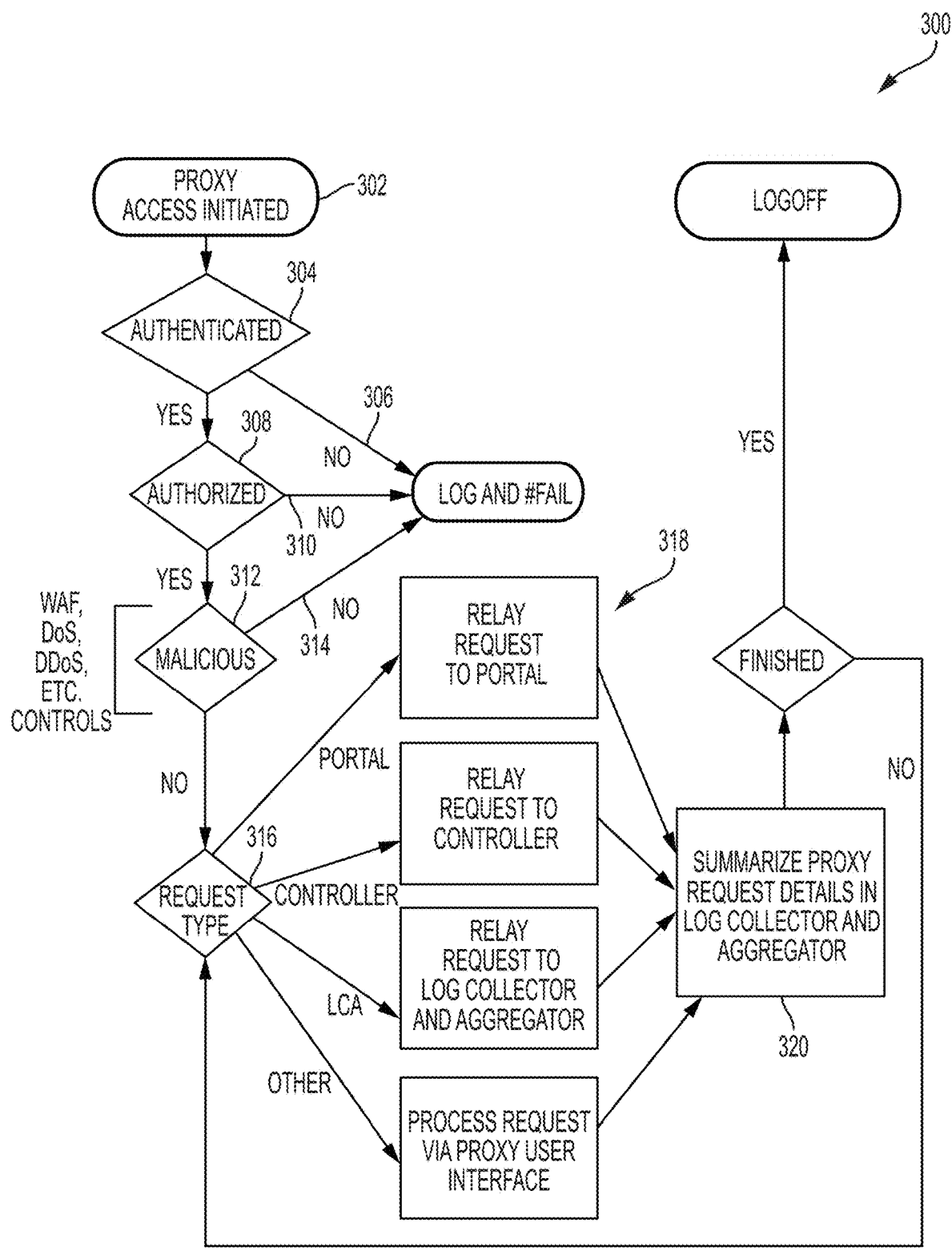
FIG. 3 is a flow diagram of a method performed by a proxy, according to some embodiments.

A method 300 performed by the proxy 122, according to some embodiments, is illustrated in FIG. 3. At step 302, access to the proxy 122 is initiated by, for example, a communication request from a customer or partner. The communication request is authenticated at step 304. If the communication request cannot be authenticated, then the access attempt is logged and access is rejected at step 306. If the communication request can be authenticated, then a check is performed at step 308 to determine if the communication is authorized. If the communication is not authorized, then access is rejected and the attempt logged at step 310. If the communication is authorized, then the communication request is checked at step 312 for malicious content, such as DoS and DDos attacks. If malicious content is detected, then the access is rejected and the access attempt is logged at step 314. If no malicious content is detected, then the proxy determines the request type (e.g., portal request, controller request, log collector request, or other request) at step 316 and relays the request at step 318 to the intended destination. Upon successful relay, the request details are stored in the log collector at step 320.

Portal

The portal 124 is a listening service that can receive and reply to incoming requests from users and other system components via the proxy 122. Users may be within a virtual perimeter for an enterprise network (e.g., a system administrator working locally within an enterprise network site) or outside of the virtual perimeter (e.g., a system administrator working remotely or a service provider configuring a virtual perimeter as a service to an enterprise network). These requests may be implemented using different formats such as HTTP. All communication can be strongly encrypted. The portal 124 can be deployed in a clustered, high availability configuration to provide fault tolerance and scalability. The portal 124 can include a multi-factor authentication (MFA) engine and can enforce MFA at login time to mitigate account and credential theft attacks.

The portal 124 can include multiple authentication, authorization, and auditing (AAA) engines and can enforce some or all to some or all incoming connections. For example, one AAA engine can be provided for user accounts, which may be subject to MFA, and another AAA engine can be provided for API/programmatic access, which may not be subject to MFA. In some embodiments, the portal 124 can also include a well-defined API that allows trusted third-parties to integrate programmatically. In some embodiments, the functions of the user interface of the portal 124 can be accessed via the API.

In some embodiments, all logs and events can be stored locally in a database and can be transmitted to the log collector 128 for centralized storage, search, and reporting. The portal 124 may include local relational database management system or other database management system for user interface and local logs/events. In some embodiments the database may be used for policy digest request queues.

In some embodiments, the portal 124 can be configured to allow service providers to manage network policies for multiple customers. Service provider users can select individual customers to manage. Also, in some embodiments, customers can be provided with accounts that only grant visibility into the configuration for that specific user.

Figure 4A:
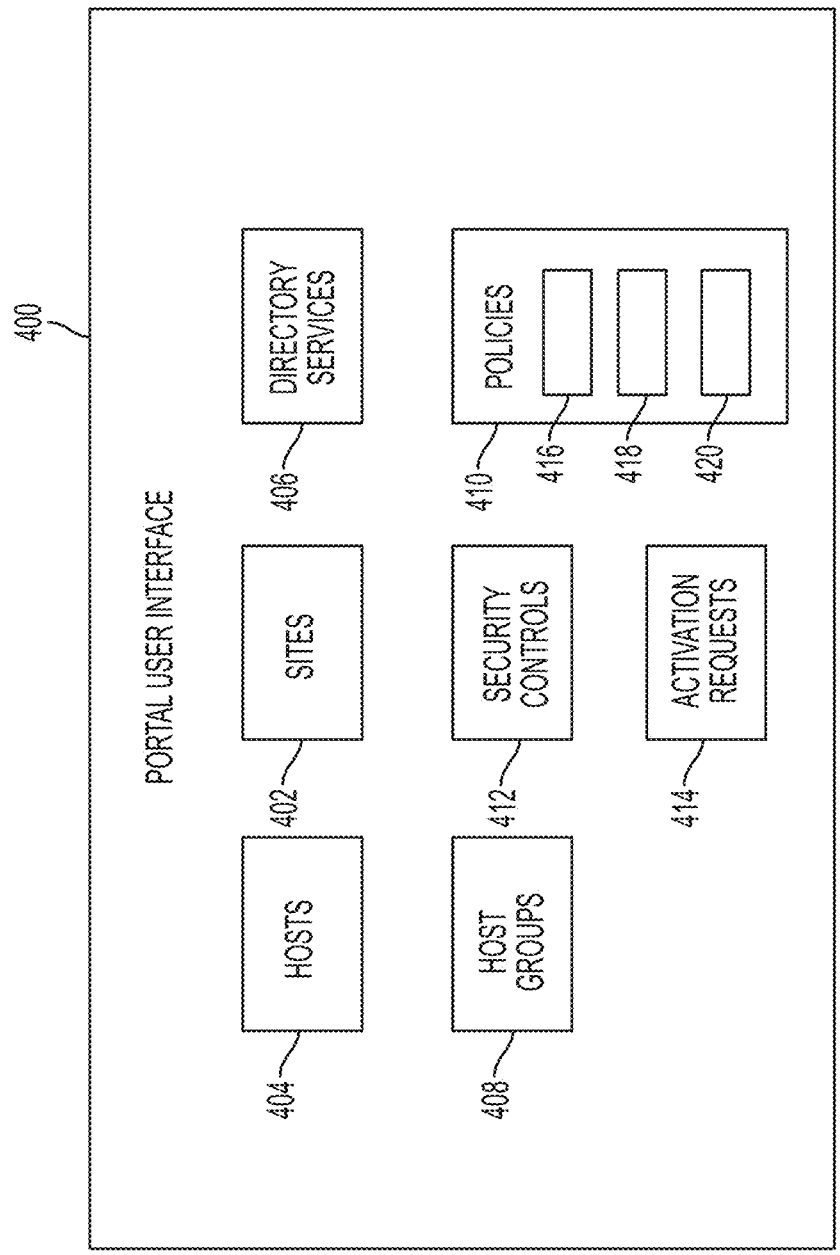
FIG. 4A is a block diagram of a portal user interface, according to some embodiments.
Figure 4B:
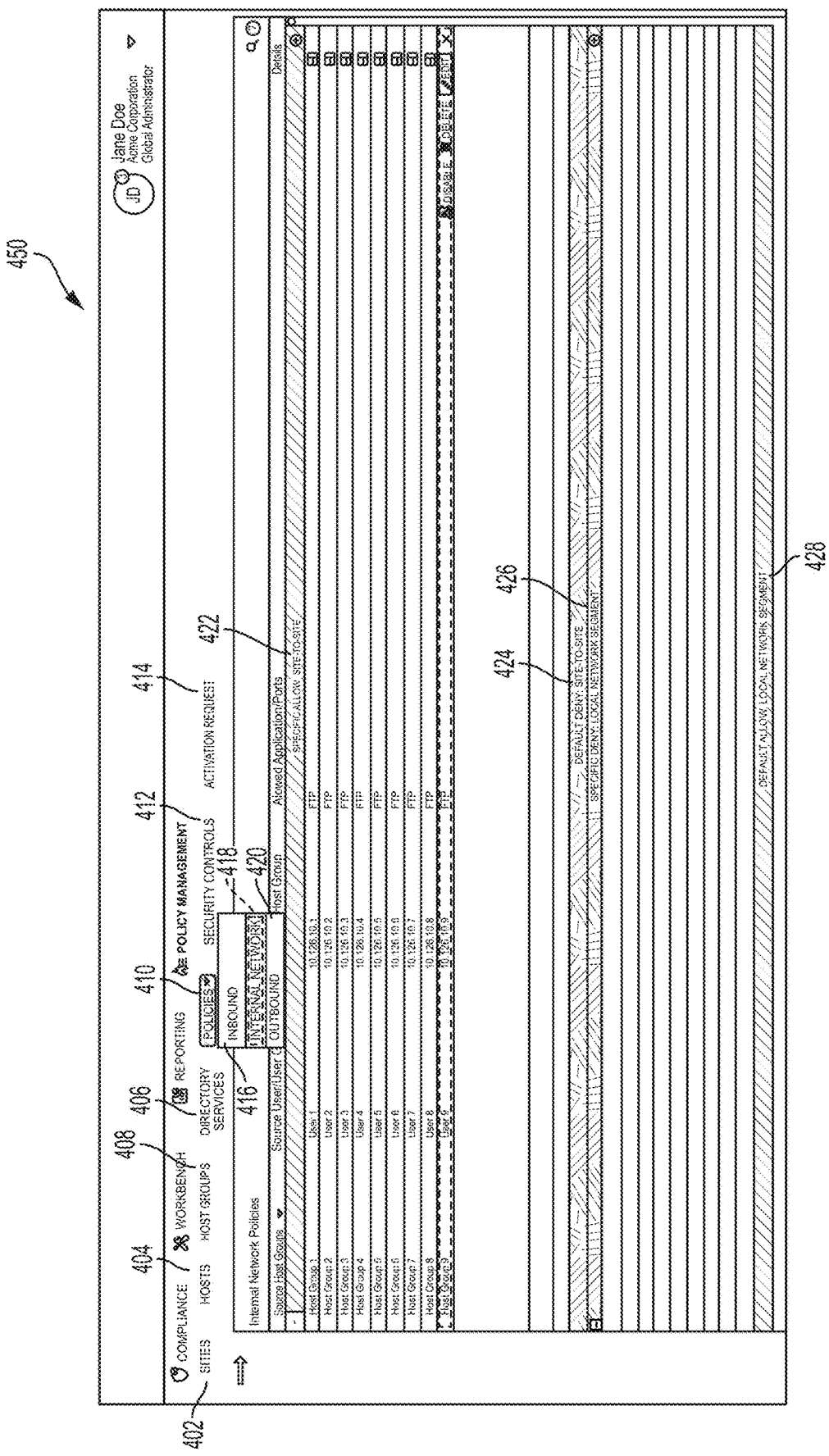
FIG. 4B is an exemplary portal user interface, according to one embodiment.

The user interface for the portal 124 has a set of functions that allow the user to configure different aspects of the system. The user interface can be divided into sections that collect different information from the user for performing the functions. FIG. 4A is a block diagram of a user interface 400 of portal 124, illustrating the different sections according to an embodiment. The sections can include sites 402, hosts 404, directory services 406, host groups 408, security policies 410, security controls 412, and activation requests 414. FIG. 4B is an example layout of a user interface, according to one embodiment.

The sites section 402 collects the information needed to connect specific locations into the P/PoP infrastructure. As new locations are created, if necessary, edge device configuration data blobs are generated by the portal 124, which can be sent to fulfillment for provisioning and auto-shipping edge devices 130 to each location. Data collected about locations can include a name, a physical address, a contact person, the number of end users at the location, whether the location requires high availability connectivity to the P/POP infrastructure, which P/PoP 121 or P/PoPs the location should connect to, whether the location will connect with an edge device, a third party VPN device, or a datacenter cross connect, the specific IP addresses, subnet masks, network gateway addresses, and other network configuration information needed for the interconnectivity, the routing policy at the location, and the list of internal network subnets at the location, and any other relevant information.

The hosts section 404 can be used to define specific hosts, particularly ones that are meant to be accessible from the Internet. Data collected about hosts includes IP addresses and port information required to configure Network Address Translation.

The directory services section 406 collects information for connecting both the P/PoP systems as well as the network segmentation controller 114 into the customer's active directory infrastructure. Connecting these systems with active directory enables security policies to be enforced based on user identity and group membership. Information collected about directory services can include IP address, port number, username, password, SSL configuration, and distinguished names for the directory tree.

The host groups section 408 can collect information about logical groupings of IP addresses, subnets, or IP address ranges on the customer's network, which are later used in policies.

The security policies section 410 can collect information about the security policy that the user would like to enforce on their network. The policies can defined in three subsections: inbound policies 416, internal network policies 418, and outbound policies 420. Security policy selections made by a user through the security policies section 410 can be automatically incorporated by the portal into one or more policy digests.

The inbound policies subsection 416 can be used when the user wants to allow traffic from the untrusted Internet to cross their virtual perimeter 102 in to computers on their network. In other words, the inbound policies subsection 416 can contain policies for network traffic flowing into the network. Each computer is defined in the hosts section 404, and the inbound policy section allows individual rules to be defined for each host, specifying source IP address ranges allowed to reach the host as well as the ports or applications that the host can be reached on. The policies set within this subsection are enforced by the cloud-based network firewalls implemented by the P/PoPs 121.

The outbound policies subsection 420 allows the user to specify individual rules from traffic emanating from internal networks across the virtual perimeter 102 to the Internet. In other words, the outbound policies subsection 420 can contain policies for network traffic flowing out of the network. Users may be asked to choose a security posture. For example, a user can choose between all outbound traffic being denied by default and users having to define rules for traffic they want to allow, or outbound traffic being allowed by default and users having to define rules for traffic they want to deny. Rules can apply to internal host groups, users, and/or user groups, and specify the destination IP addresses, applications, and/or ports that that access is either allowed or denied for. The policies set within this subsection are enforced by the cloud-based network firewalls implemented by the P/PoPs 121.

The internal network policies subsection 418 is used to specify rules for interconnection between hosts behind the virtual perimeter 102. Rules can be specified for traffic between different enterprise network sites as well as for traffic between individual hosts on local network segments. Rules can specify source host groups, users, or user groups, and destination host groups, applications, and ports. The internal network policies can have a particular order of evaluation. For example, first, specific rules allowing traffic between hosts and between sites can be specified. The user can also specify that multi-factor authentication is required for traffic that is allowed. Any traffic not explicitly allowed between different sites may be denied. Then, specific rules denying traffic between hosts on the same local network can be specified. Any traffic not explicitly denied between hosts on the same local network segment can be allowed. This structure is grounded in the traditional expectation that hosts on local network segments are allowed to communicate with each other by default, and enables the user to introduce controls that limit this communication on a case-by-case basis where it is most needed. The internal network policies may be enforced by the cloud based firewalls and software-defined network segmentation controller 114 implemented by the P/PoPs 121, the network segmentation agents 113, or both. By setting the internal network policies through the central manager 120, the operations of the virtual firewall and the software-defined network segmentation subsystem can be harmonized.

The security controls section 412 of the user interface 400 allows the user to control a number of network security features available from the virtual perimeter 102 and network segmentation subsystem 104 capabilities. These security features can include global bans of, for example, applications and ports that should be blocked throughout the network, IP blacklists specify IP addresses that should be blocked throughout the network, and URL filters that specify what categories of URLs the user would like to deny access to within the virtual perimeter 102, as well as exceptions that can be defined for host groups, users, or user groups.

The security controls section 412 also allows the user to specify the configuration of VPN access to the virtual perimeter 102, which may include IP addresses for VPN clients, DNS settings, as well as users and usergroups that are allowed to access the VPN. In some embodiments, the user can also specify the configuration of multi-factor authentication services. Further, in some embodiments, various network security capabilities within the virtual perimeter 102 can be specified, including threat management, anti-virus, anti-spyware, DNS sinkholes, file blocking, and auditing.

The activation request section 414 allows the user to submit the changes that they have made to the configuration of a virtual perimeter 102 and/or network segmentation subsystem 104 as an activation request, and to check the status of any currently submitted activation requests. Once changes have been made to configurations for a particular customer, the user requesting the changes can submit those changes as an activation request. The set of configuration changes represented by an activation request are automatically translated into a policy digest 123 and placed into a policy digest request queue.

In addition to receiving requests from users, for example, for configuration changes, the portal 124 can also receive requests from the automator 126 (which is discussed further below) checking for pending policy digests 123. For example, via an encrypted channel, the portal 124 can accept a network connection from the automator 126 respond back with the number of policy digests 123 in the policy digest request queue. The portal 124 can also receive a request from the automator 126 to retrieve the current set of pending policy digests 123. The portal 124 can accept a network connection from the automator 126, for example, via an encrypted channel, and then respond back with the one or more policy digests 123 in the policy digest request queue. In some embodiments, the automator 126 may then send a status value back to the portal 124 and if that status value represents success, the policy digest request queue is flushed. If the value is failure (or anything other than success) then the policy digest request queue may be kept intact.

In some embodiments, once the status has been updated for a particular policy digest (e.g. successfully retrieved by the automator 126), the corresponding activation request status can be updated so that the customer can be informed of the status of their request. In some embodiments, the portal 124 can generate email notifications and/or other types of notifications to users informing them that the status of their activation request has changed.

FIG. 4B illustrates an exemplary user interface 450 for the setting of security policies through selection of the internal network policies 418 from a dropdown menu for the security policies 410 subsection. The administrator (e.g., Jane Doe of Acme Corporation) can craft the internal network policy (e.g., for Acme Corporation's network) by defining what users are authorized to do on the internal network. The top section 422 in the internal network policy in the embodiment of FIG. 4B is titled "Specific Allow Site-to-Site," and this may be where the Administrator defines rules for what users are allowed to do. These rules may be applied to both the firewalls implemented by the P/PoPs 121 and the network segmentation agents 113. Examples might include allowing Users in the Finance group to access the Financial Database on the HTTPS port or allowing Systems Administrators to access Employee Workstations on the "Remote Desktop" port. Rules can be applied, for example, to groups of IP addresses (host groups) or user groups that are imported from the customer's Active Directory. Both the cloud based firewalls implemented by the P/PoPs 121 and the network segmentation agents 113 can keep in sync with Active Directory groups.

The internal network policy in the example user interface of FIG. 4B includes a section 424 labeled "Default Deny: Site-to-Site," which means that any traffic that was not defined in section 422 as specifically allowed within the internal enterprise network will be denied by the cloud based firewalls if the traffic is flowing between different sites. The internal network policy also includes a section 426 labeled "Specific Deny: Local Network Segment," in which the Administrator can define rules prohibiting traffic on local network segments. For example, they might want to block all traffic on port 3389. Defining such a rule here can result in that traffic being blocked on local network segments by the network segmentation agents 113 unless it was explicitly allowed by another rule in the "Specific Allow" section 422. A section 428 is provided at the bottom of the user interface in this embodiment indicating that any traffic not explicitly denied will be allowed between hosts on local network segments.

FIG. 4C illustrates an exemplary policy digest 1400 that has been simplified for illustration purposes. Policy digest 1400 may be generated according to a predefined syntax based on the setting and configurations selected utilizing the user interface 400 of FIG. 4A. Policy digest 1400 is associated with company "Acme Plus." The first section 1402 defines a single customer site in Los Angeles. The second section 1408 is Zones (aka "host groups"), which defines the FINANCE-SERVERS zone. The third section 1404 is Devices (aka "hosts"), which defines a web server. The fourth section 1406 is Domains, which defines the domain name for the web server and specifies DDOS protection as enabled. The fifth section 1410 is Inbound Policies, which specifies allowing traffic on ports 80 into server 632 (the web server). The sixth section 1412 is Security Controls in which security features are turned on or off.

The seventh section 1414 is "Zone Policies," which can be the internal and outbound policies. Two policies ("Rule 174" and "Rule 171") are defined. Rule 173 an internal specific deny for the local network segment specifying that WORKSTATIONS cannot talk on ports 135, 445, and 3389. Rule 171 is an internal specific site-to-site allow specifying that users in the HelpDesk, Patch_Mgmt, SOC, and Domain Admin user groups can access WORKSTATIONS on port 3389. Rules 171 and 73 can apply to the network segmentation subsystem 104. Therefore, if someone in the HelpDesk group wanted to access a Workstation on port 3389, they would be able to do so, but other users on workstations would be denied access to that port on other computers in their local network segments by the segmentation agents. Section 1416 defines configurations for come security controls. Accordingly, this simplistic example illustrates that user configuration selections for an enterprise network made through the user interface can be automatically converted into a policy digest according to a predefined syntax.

Figure 5:
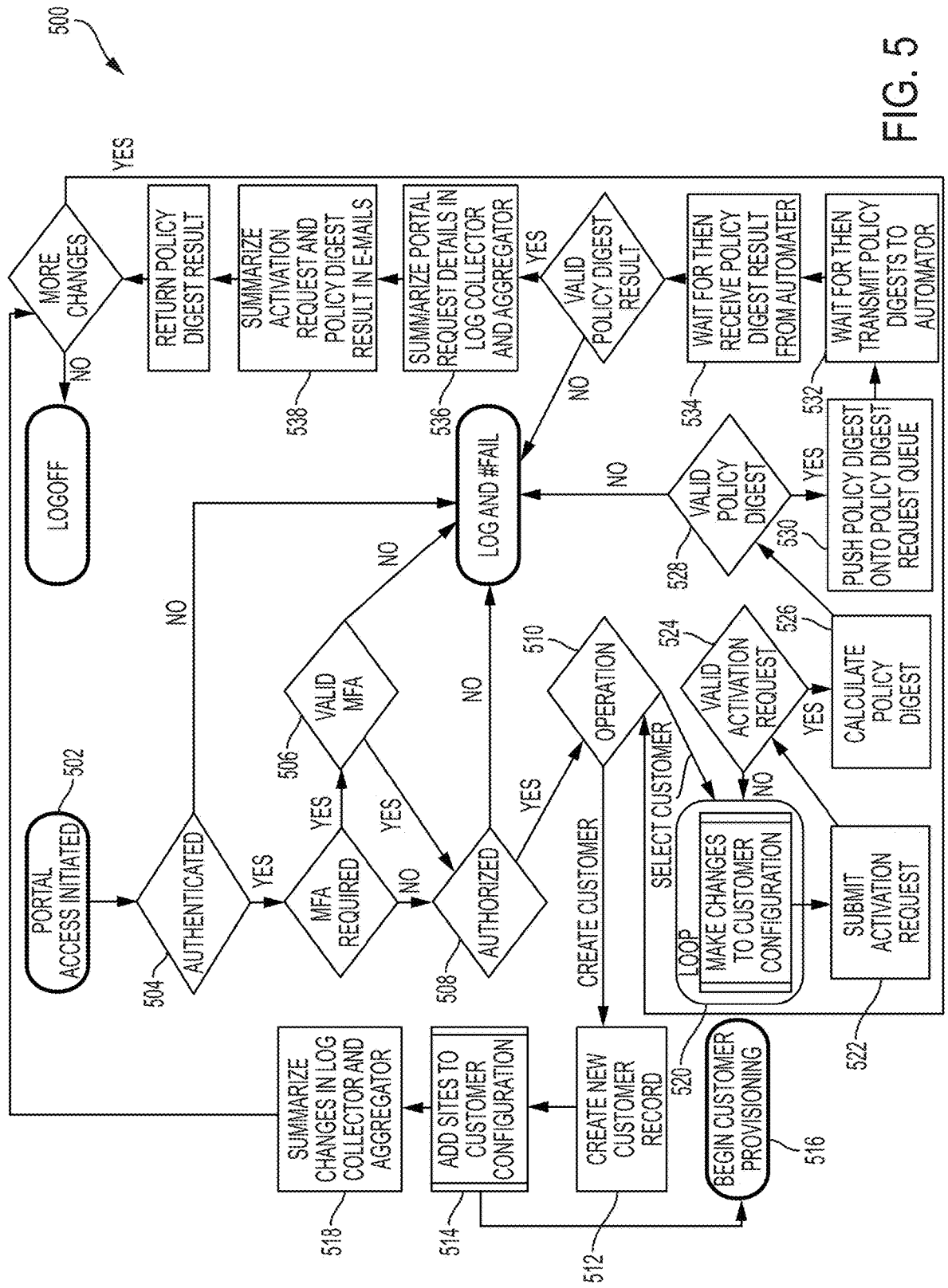
FIG. 5 is a flow diagram of a method performed by a portal, according to some embodiments.

FIG. 5 illustrates a method 500 performed by a portal 124 according to one embodiment. At step 502 portal access is initiated such as via a login attempt by a user. The access can be run through one or more AAA engines. For example, the access can be authenticated at step 504 and if authentication is unsuccessful, the access attempt can be logged and rejected. If the access is authenticated, then the access can be subjected to an MFA check, if required for the type of access (e.g., user versus API), at step 506. If MFA is required and is unsuccessful, then the access attempt can be logged and rejected. If MFA is required and is successful or if MFA is not required, then the portal can determine whether the access is authorized at step 508. Again, if the access is not authorized, then the access attempt can be logged and rejected.

If the access attempt is successful, then one or more portal operations may be performed at step 510. One operation that may be performed is creating a new customer record for a new customer at step 512. With a new customer record created, customer sites (e.g., locations) can be added to a customer configuration at step 514. With sites added, customer provisioning can be performed at step 516, which may include provisioning one or more edge devices 130 for the customer sites. The new customer creation and customer configuration can be summarized in the log collector 128 at step 518.

Another operation that can be performed is making changes to an existing customer configuration of a virtual perimeter 102 and/or a network segmentation subsystem 104. After selecting a customer, changes to the customer's configuration can be selected at step 520, such as through the user interface 400 of the portal 124. Once the configuration changes have been selected, an activation request for implementing the configuration changes in the virtual perimeter can be submitted at step 522. The activation request can be checked for validity at step 524. If the request is invalid in some way, then the user can be prompted to make one or more changes to the configuration change request. If the activation request is valid, then a policy digest is calculated at step 526 and then checked for validity at step 528. If the policy digest is invalid in some way, then the change attempt can be logged and the access can be terminated. If the policy digest is valid, then the digest can be pushed onto the policy digest request queue at step 530.

Reasons for the policy digest to be invalid include a software bug in the portal, the portal being compromised by a hacker, with the hacker is attempting to submit a malformed policy digest. Other reasons can be the administrator entering data into the portal that passed the portal's validation checks but fails the automator's 126 checks. This may happen, for example, if the automator's 126 checking of the validity of what the user has entered is more thorough than the Portal's. Example of checks that the automator 126 may perform can include whether the administrator has entered data that doesn't make any sense, such as by submitting letters where a numeric IP Address is needed and the administrator trying to use IP Addresses that belong to someone else, or user groups that don't exist in their Active Directory. Other examples can include the state of the network changing between the time that the Portal generated the Policy Digest and the time that the Automator validated it—for example, a user group existed in Active Directory at the time that the Administrator submitted the Activation Request, but it was removed before the Automator did it's validation. These are but a few examples of the validity checks that may be performed on a policy digest.

At step 532, the policy digest is transmitted to the automator 126 in response to a request from the automator, which may be on a predefined request schedule for the automator 126 to request queued digests. At step 534, the portal may receive an indication from the automator 126 of whether the policy digest transmitted to the automator 126 was successfully received and/or was determined to be valid by the automator 126. If a negative indication is received, then the failed policy digest transmission can be logged and the access may be terminated. Otherwise, the configuration change request can be summarized in the log collector 128 at step 536. In some embodiments, the activation request and the policy digest transmission can be summarized and provided to the requestor at step 538, such as in an email sent to the requestor. The method can return to step 510 for one or more additional operations to be performed, such as changes to a virtual perimeter configuration of a second customer that is also managed by the user logged into the portal.

Automator

According to some embodiments, the automator 126 is a daemon service that can periodically, such as on a predefined schedule, request the list of pending policy digests 123 currently queued on the portal 124. If there are any digests pending, the automator 126 can retrieve them, service them by affecting changes on the virtual perimeter 102 and/or the network segmentation subsystem 104, as well as any other system or component, and then return back a status object.

In some embodiments, the automator 126 can poll the portal 124 to check for pending policy digests 123. The automator 126 may send a network request to the portal, for example, via an encrypted channel, which will respond back with the number of pending policy digests 123 in the portal's local policy digest request queue. If there are queued policy digests 123, then the automator 126 may then retrieve the current set of pending policy digests 123. For example, the automator 126 may send a network request to the portal 124, such as via an encrypted channel, and the portal may respond back with the contents of the policy digests 123 in the policy digest request queue. In some embodiments, the automator 126 can indicate success back to the portal 124 and close the channel.

According to some embodiments, the automator 126 has a database of authentication credentials that may be needed to access the APIs and other interfaces on different virtual perimeter 102 and network segmentation subsystem 104 components, as well as the supporting systems and network infrastructure those systems rely on, in order to make configuration changes to those systems in accordance with policy digests 123.

The automator 126 may include an inventory management database that defines which physical systems and virtual machines serve which customer. The automator 126 can consult this database prior to making changes to the configuration of a system in accordance with a policy digest 123 to determine the appropriate system on which to make the change. Further, in some embodiments, the automator 126 can consult this database to identify available resources with which new customers can be provisioned. Based on the identified resources, the automator 126 can automatically provision new network segmentation systems, new virtual perimeter systems, and other supporting network infrastructure and supporting systems to serve new customers. The automator 126 can also automatically deprovision network segmentation systems, virtual perimeter systems, and other supporting systems and network infrastructure, for example, when customers have canceled their services. The automator 126 can update the inventory management database to reflect the provisioning and deprovisioning of systems for customers.

According to some embodiments, the automator 126 is configured to validate the contents of each policy digest 123 in order to determine whether the policy digest 123 is syntactically correct, according to a predefined format, and also to determine whether the policy digest 123 describes changes to systems that are inconsistent, create significant security exposures for the customer, appear to be suspicious or potentially fraudulent, that exceed the customer's licenses or subscriptions, and/or violate any other rules for the configuration of systems that may be defined. The automator 126 can refuse to process any policy digest that fails such validation checks.

The automator 126 can automatically decode the policy digests 123 into a set of actions to be performed. Each piece of information collected by the portal 124, such as via the user interface and/or API, and encoded in a policy digest 123 instructs the automator 126 to take particular actions. These actions could include provisioning and deprovisioning of virtual perimeter 102 systems, network segmentation subsystems 104, and other supporting systems, as well as adding, removing, or modifying parts of the configuration of any of those systems, either via API calls or other interfaces exposed to the automator 126 by those systems.

In general, the automator 126 can identify the correct virtual perimeter 102 systems, network segmentation subsystems 104, and/or other systems to be configured by cross referencing the information in the policy digest 123 with the information in the inventory management database. Information in policy digests can include information about sites, hosts, directory services, host groups, policies, and security controls. The automator's use of such information is described in more detail below.

The automator 126 can use the information collected about sites to provision or deprovision virtual perimeters 102, network segmentation subsystems 104, and other supporting systems and infrastructure needed to support sites that are connected to the P/PoP infrastructure. The automator 126 may also configure virtual perimeters to accept connections from customer premises equipment at sites, including edge devices 130. The automator 126 may determine the appropriate P/PoPs and other virtual perimeter systems to configure for the site to access, based on information in the inventory management database.

The automator 126 can use directory services information to configure virtual perimeters, network segmentation subsystems, and other supporting systems to connect into the customer's active directory so that those systems can enforce policies based on user identity and group membership.

The automator 126 can use information about hosts to configure policies within the virtual perimeter 102. The automator 126 can use information about host groups to configure virtual perimeters network segmentation subsystems, which are referred to by rules in the policies.

Policy digests can include three kinds of policies: inbound policies, internal network policies, and outbound policies. The automator 126 can configure a virtual perimeter 102 based on information in inbound policies to allow traffic to pass to systems behind the perimeter as specified in the policy digest 123. The automator 126 can determine the appropriate virtual perimeter 102 on which to configure inbound policy rules by cross referencing the IP addresses of the hosts in each rule with the IP addresses associated with each site and the information in the inventory management database indicating which virtual perimeter systems support which sites.

The automator 126 may configure rules in the virtual perimeter 102 corresponding to internal network policies allowing traffic between different sites. The automator 126 may also configure rules in the network segmentation subsystem 104 corresponding to internal network policies, allowing traffic between sites, requiring multi-factor authentication, and/or blocking traffic between hosts on the same local network segment. Outbound policies can be used by the automator 126 to configure rules in the virtual perimeter 102 that correspond to the rules specified in the outbound policies.

Information about security controls that can be used by the automator 126, according to some embodiments, can include information about global bans and IP blacklists, which can be implemented at both the virtual perimeter 102 as well as the network segmentation subsystem 104. The automator 126 can configure URL filtering at the virtual perimeter 102.

In some embodiments, the automator 126 can configure VPN access to the virtual perimeter based on a user's settings as provided in a policy digest 123. The automator 126 can configure the customer's specified multifactor authentication settings on both the virtual perimeter 102 and the network segmentation subsystem 104. The automator 126 can also configure various network security capabilities within the virtual perimeter 102, including threat management, anti-virus, anti-spyware, DNS sinkholes, file blocking and auditing, based on the information in the policy digests 123.

In some embodiments, some or all informational events and/or errors can be logged locally and/or to the log collector 128. In some embodiments, the automator 126 can be deployed in a clustered, high availability configuration to provide fault tolerance and scalability.

As illustrated in FIG. 1, the automator may be in a different security zone (Zone 3) than the proxy 122 (Zone 1) and the portal 124 (Zone 2). In some embodiments, connections can flow outbound from Zone 3 to the systems in Zone 2, but no connections of any kind can be established from Zone 2 (i.e., originating in Zone 2) to systems in Zone 3. This isolates the automator 126 and the infrastructure that it has access to from being directly exposed to the Internet, or indirectly exposed via the proxy 122. Therefore, if an attacker were to compromise the proxy 122 or the portal 124, that attacker would be unable to connect from those systems to the automator 126 or the infrastructure that the automator 126 controls. The attacker would only be able to control the automator 126 by defining policy digests 123, and those policy digests 123 will still be subject to the automator's validation steps before being processed.

Figure 6:
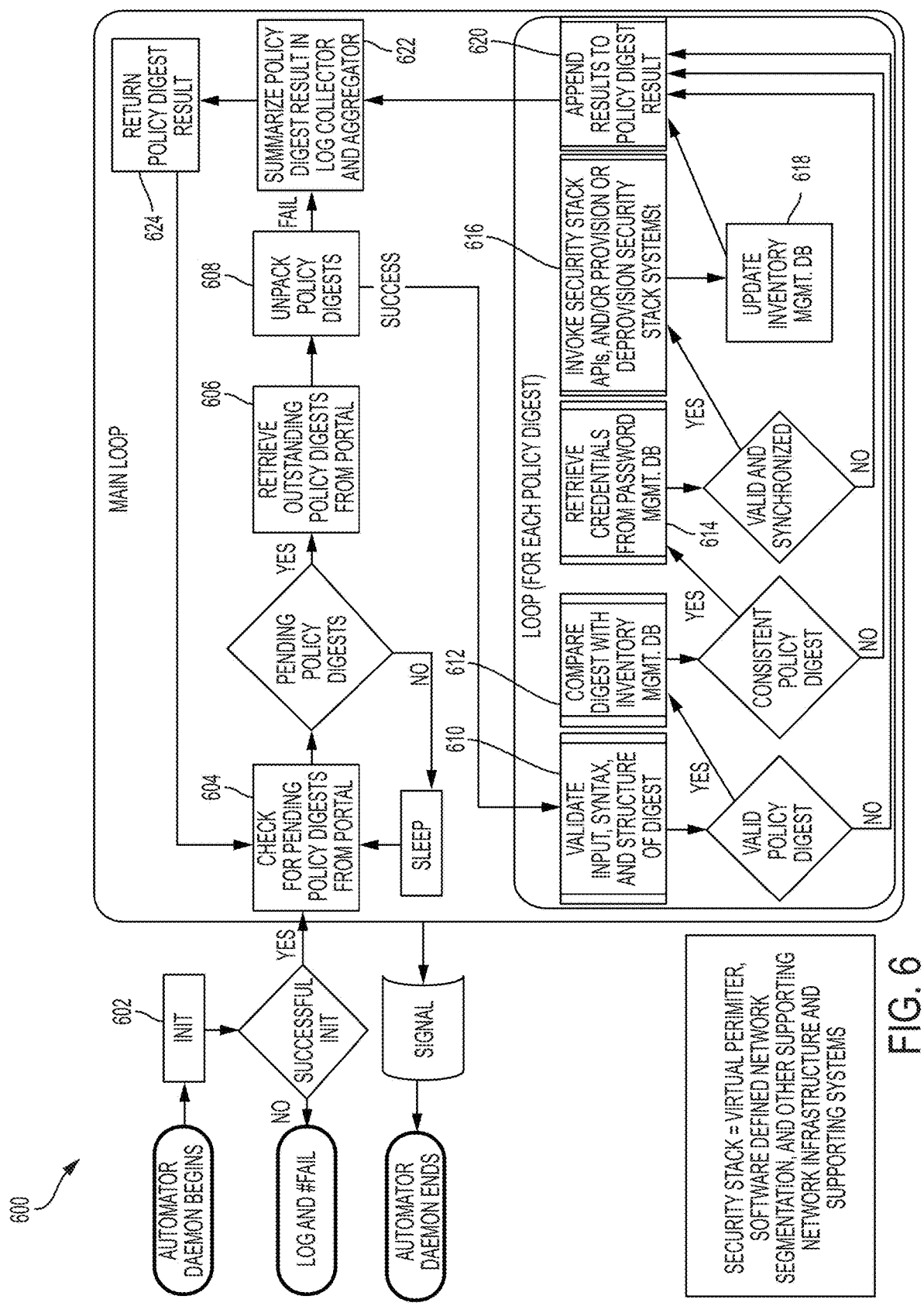
FIG. 6 is a flow diagram of a method performed by an automator, according to some embodiments.

FIG. 6 illustrates a method 600 that may be performed by an automator 126, according to some embodiments. At step 602, the automator daemon is initialized. A failed initialization can be logged. Upon successfully initialization, the automator checks for pending policy digests by sending a query to the portal 124 at step 604. If the portal responds with an indication of no policy digests, then the automator sleeps until the next periodic check, which may be based on a predefined schedule. If the portal indicates that there is a policy digest, then the automator sends a request to the portal at step 606 for transmission of the queued policy digests. Upon receiving the policy digests, the automator unpacks the digest(s) at step 608. A failure at this step can be summarized and stored in the log collector 128.

Successful unpacking leads to steps 610 through 620 being performed for each policy digest retrieved from the portal. At step 610, the automator validates the policy digest. This step can include validating syntax and structure of the policy digest based on a predefined format. If the policy digest is valid, then at step 612 the automator compares the information in the policy digest with information in the inventory management database to determine whether the information related to the physical systems and virtual machines in the policy digest is consistent with the information in the inventory management database. At step 614, credentials needed for accessing system resources for provisioning, deprovisioning, reconfiguring, etc., can be retrieved from the authentication credentials database. At step 616, if the credentials are valid and synchronized, the automator can provide configuration, provisioning, and/or deprovisioning instructions to one or more virtual perimeter and/or network segmentation subsystem components, for example, by invoking APIs such as P/PoP security stack APIs for configuring and reconfiguring virtual perimeters, depending on the requests in the policy digest.

At step 618, the inventory management database can be updated based on the configuring, provisioning, and/or deprovisioning of system components in step 616. At step 620, the changes made to the system can be summarized in a policy digest result report. Further, any failures in steps 610 through 614, such as an invalid or inconsistent policy digest or invalid credentials can be summarized in the policy digest result report. Steps 610 through 620 may be performed for each policy digest received from the portal. At step 622, the policy digest result reports can be summarized in the log collector 128 and the policy digest result can be returned to the portal at step 624.

Edge Device and Endpoint Agents

Figure 7:
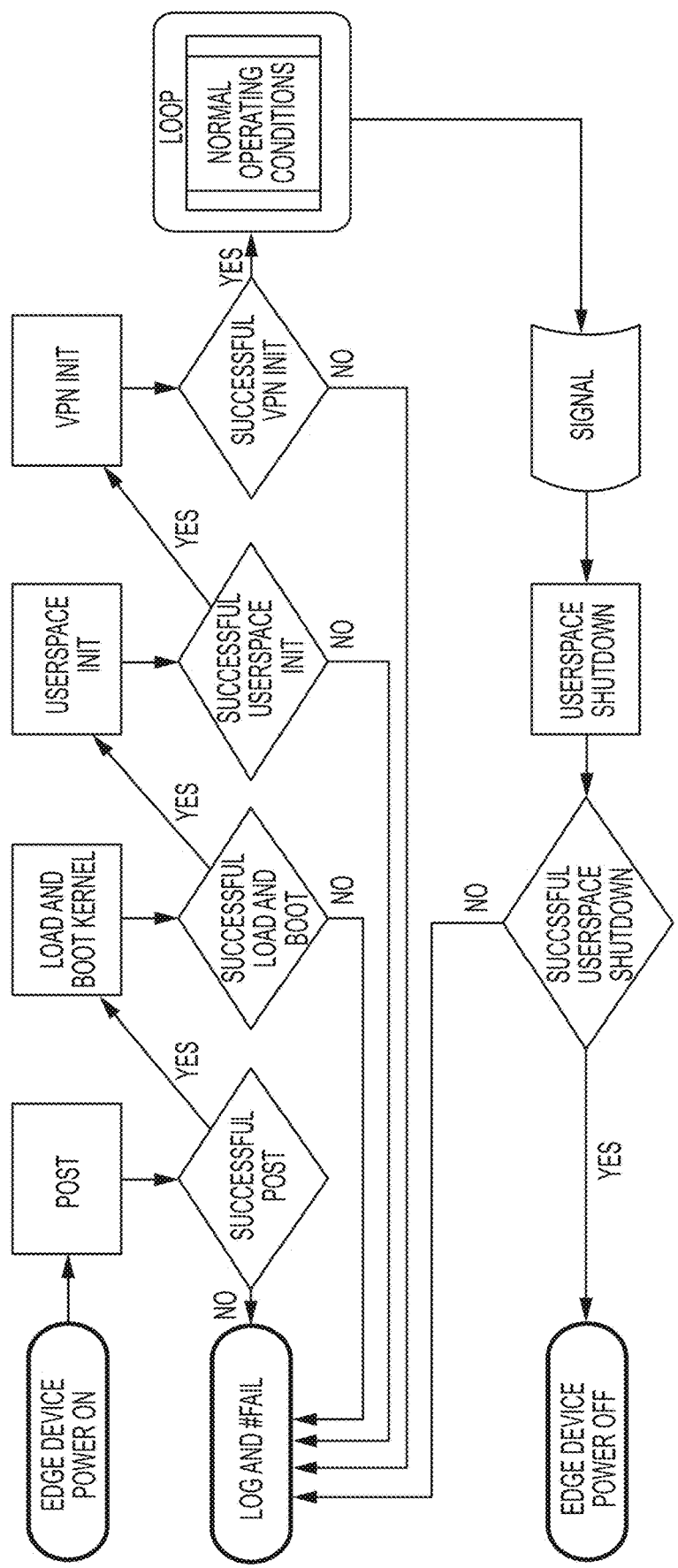
FIG. 7 is a flow diagram of the operation of an edge device, according to some embodiments.

The edge device 130 is a physical networking appliance (e.g., a commercial off-the-shelf (COTS) appliance) that is installed at a remote site for integrating the remote site within the virtual perimeter by connecting the remote site to one or more P/PoPs 121. FIG. 7 illustrates the operation of an edge device 130, according to some embodiments. Connection to one or more P/PoPs may also be provided by endpoint agents, which can include or incorporate network segmentation agent 113 as well as a software VPN client, that can be installed on a client system to facilitate secure VPN connectivity into one or more P/PoPs 121. The endpoint agent may be used in place of or in addition to the edge device 130 for secure connectivity into the P/PoP 121.

Figure 8:
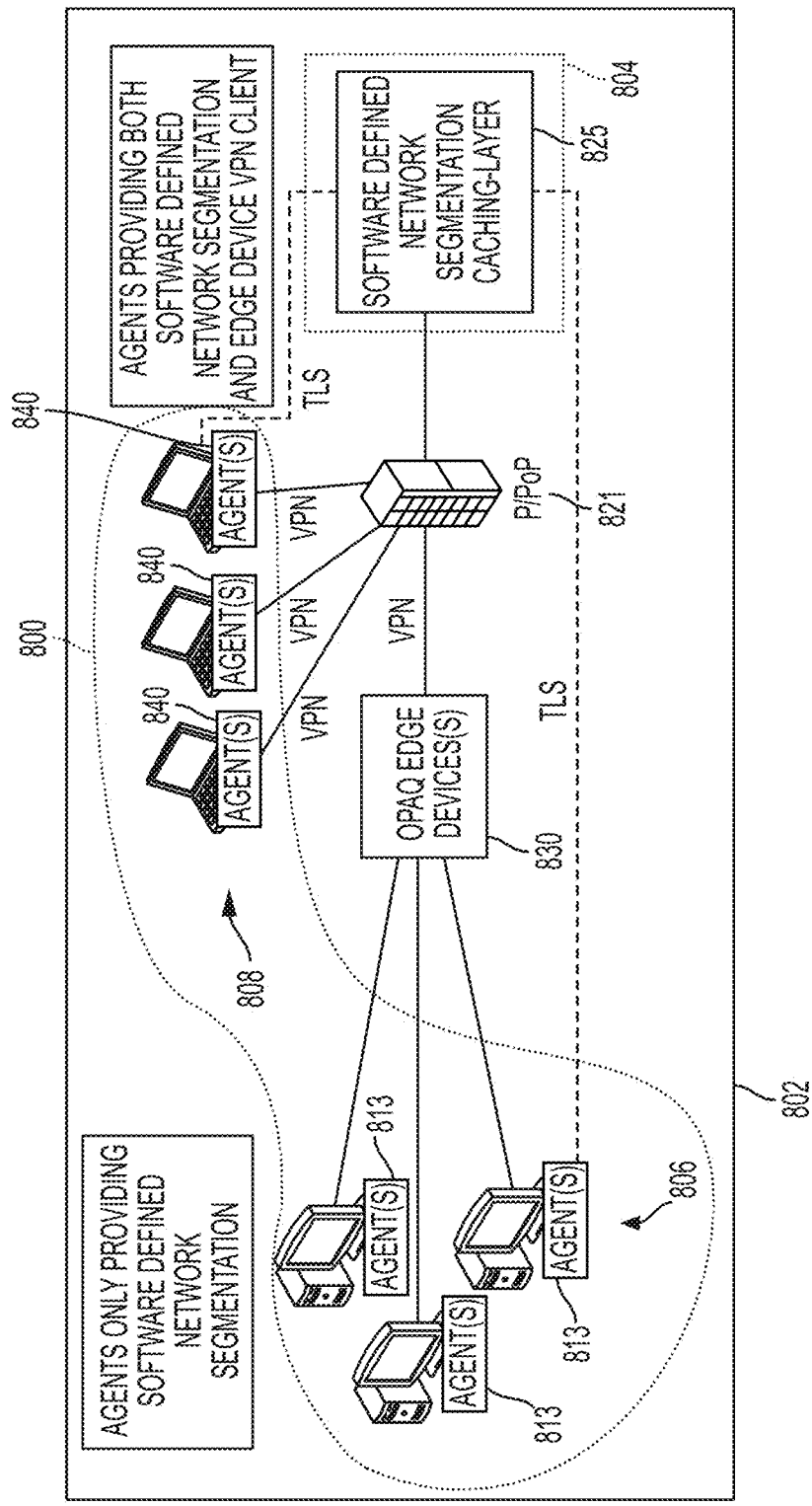
FIG. 8 illustrates a virtual perimeter and network segmentation services provided using a combination of edge devices and endpoint agents for protecting an enterprise network, according to some embodiments.

FIG. 8 illustrates an enterprise network 800 protected by a virtual perimeter 802 and a network segmentation subsystem 804 in which both edge devices 830 and endpoint agents 840 are utilized. A first site 806 of the enterprise network 800 communicates through one or more P/PoPs 821 via an edge device 830. The endpoints in the first site 806 each include a network segmentation agent 813. A second site 808 of the enterprise network does not communicate through an edge device. Instead, an endpoint agent 840 is installed on each endpoint of the second site 808. These endpoint agents 840 connect directly to the P/PoPs 821 via a VPN connection. The endpoint agents 840 also incorporate the network segmentation agents for accessing the software defined network segmentation caching-layer 825 for including the endpoints in the network segmentation subsystem 804.

In some embodiments, when a new customer site is configured in the portal 124, the portal 124 will generate an edge device 130 configuration data blob, and send the data blob to fulfillment. Fulfillment will auto-provision and auto-ship one or more edge devices 130 to the customers locations, corresponding to how sites are defined in the edge device 130 configuration data blob. Additionally, endpoint agents can be made available for the new customer to download and install, as appropriate. The customer can unbox, rack and stack, and power on each edge device 130 and/or install endpoint agents. The customer may then update their local network configuration to send all traffic to the edge device 130(s). After this, all site traffic will be tunneled through to the P/PoPs per the edge device configuration and will, therefore, be subject to the virtual perimeter service area systems and sub-systems.

In some embodiments, the caching-layer 125 is hosted at a P/PoP 121 and local endpoint agents that incorporate network segmentation agent 113 can talk to the caching-layer 125 for retrieving cached rules via, for example, VPN.

In some embodiments, the edge device 130 can enforce traffic shaping and bandwidth control, to ensure the virtual connection extended to the customer does not exceed predefined maximums and to ensure a minimum level of service. The edge device 130 can be controlled, monitored, and updated with no customer interaction.

Figure 9:
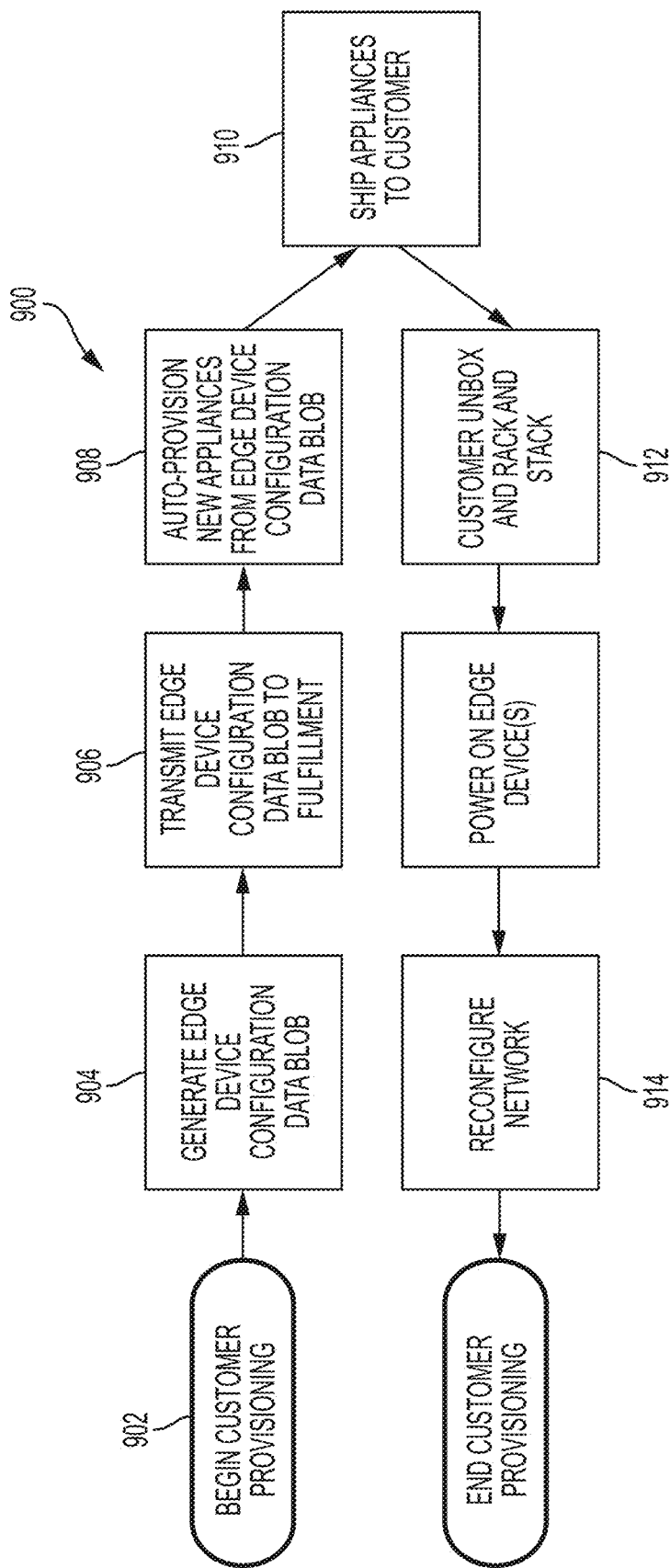
FIG. 9 is a flow diagram of an onboarding process for a new customer, according to some embodiments.

FIG. 9 illustrates a method 900 for provisioning a new customer, according to one embodiment. At step 902, a partner logs into the portal, via the proxy, and creates a new customer and defines one or more new sites for the customer's enterprise network. The partner may inputs additional configuration into the Portal for the customer's network, such as defining the policy for the firewalls, and then commits these changes via saving an "Activation Request."

The changes are encoded into a policy digest and put into the portal's internal policy digest request queue. The automator will retrieve the policy digest from the portal, decode it into a set of actions to take on virtual perimeter and network segmentation systems, as well as other supporting systems. The automator will validate that the policy digest is syntactically valid and the set of actions conform to the automator's validation rules. The automator will make the requested changes then send the results back to the portal and log these results in the log collector.

For each site that has been defined, an edge device configuration data blob is generated at step 904. The data blobs are transmitted to fulfillment at step 906. At step 908, one or more edge device can be auto-provisioned using that respective data blob. The one or more edge devices are shipped to customer for installation at their remote site(s) at step 910.

Upon receipt of an edge device, the new customer racks and stacks the edge device(s) at step 912. At step 914, the new customer performs basic local network configuration to route all traffic through edge device(s). After booting, each edge device 130 will establish a VPN tunnel with a P/PoP and the customer's network is then part of the distributed virtual perimeter, on their own distributed private segment, and receiving all the benefits of the Virtual Perimeter.

The customer can also install endpoint agents on local systems, which can talk to the network segmentation caching-layer within the P/PoP for centralized policy and configuration. At this point the customer is receiving the benefits of the virtual perimeter and software defined network segmentation entirely in a self-service fashion and can iterate over this "make changes; save" loop as often as they please, and changes will be affected in the virtual perimeter and software defined network segmentation systems accordingly.

Figure 10:
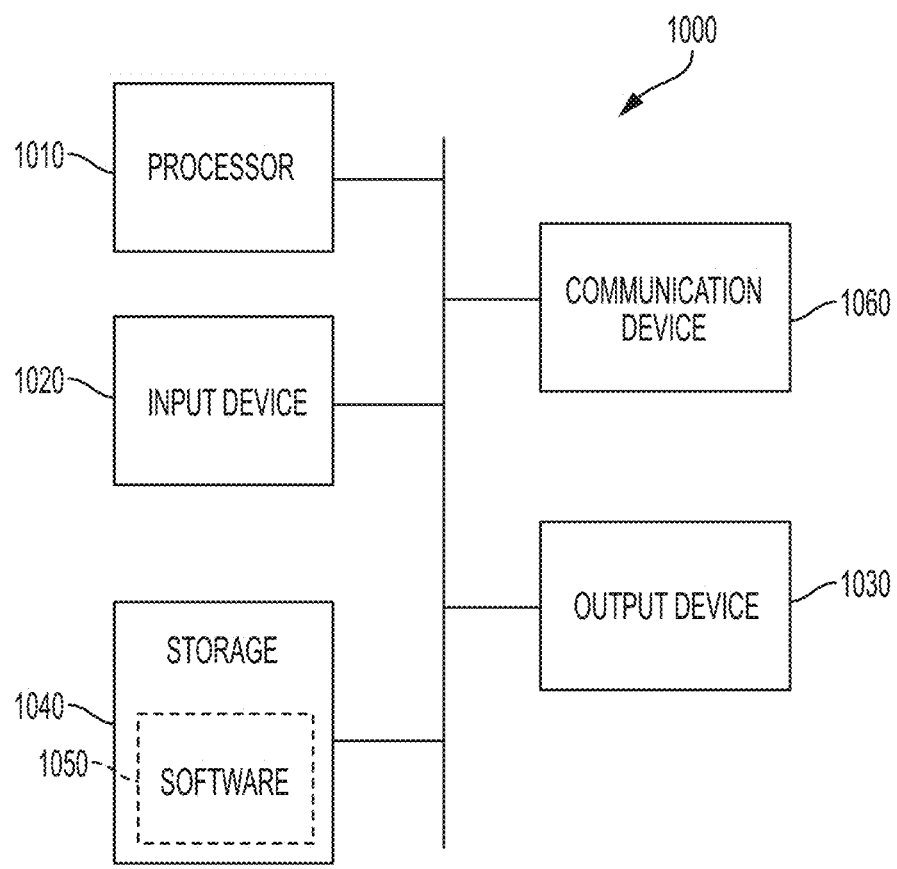
FIG. 10 is a block diagram of a computer, according to one embodiment.

FIG. 10 illustrates an example of a computer in accordance with one embodiment. Computer 1000 can be a host computer connected to a network. Computer 1000 can be a client computer or a server. As shown in FIG. 10, computer 1000 can be any suitable type of microprocessor-based device, such as a personal computer, workstation, server or handheld computing device such as a phone or tablet. The computer can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen or monitor, keyboard, mouse, or voice-recognition device. Output device 1030 can be any suitable device that provides output, such as a touch screen, monitor, printer, disk drive, or speaker.

Storage 1040 can be any suitable device the provides storage, such as an electrical, magnetic or optical memory including a RAM, cache, hard drive, CD-ROM drive, tape drive or removable storage disk. Communication device 1060 can include any suitable device capable of transmitting and receiving signals over a network, such as a network interface chip or card. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the computers, servers and devices as described above). In some embodiments, software 1050 can include a combination of servers such as application servers and database servers.

Software 1050 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Computer 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for protecting an enterprise network, the method comprising, at a system comprising one or more processors and memory that are remote from the enterprise network:
controlling communications to and from the enterprise network according to a set of security policies;
controlling endpoint to endpoint connections within the enterprise network according to the set of security policies;
receiving a request for modifications to one or more policies of the set of policies;
automatically generating a policy digest formatted according to a predefined format, the policy digest comprising the modifications, and storing the policy digest in the memory;
retrieving the policy digest from the memory;
generating one or more calls to one or more system components that control the communications to and from the enterprise network and the endpoint to endpoint connections based on the policy digest; and
modifying control of the communications to and from the enterprise network and the endpoint to endpoint connections based on the one or more calls.

2. The method of claim 1, wherein the request for modifications is based on selections made by a user via a user interface.

3. The method of claim 1, wherein the communications for the enterprise network is routed through one or more perimeter points of presence and the one or more calls are one or more calls for modification of a security stack implemented by the one or more perimeter points of presence.

4. The method of claim 1, wherein the policy digest comprises one or more of an inbound network traffic policy modification, an outbound network traffic policy modification, and an internal network traffic policy modification.

5. The method of claim 1, wherein the policy digest is retrieved according to a predefined schedule.

6. The method of claim 1, wherein the policy digest is retrieved by a daemon service that generates the one or more calls to the one or more system components.

7. The method of claim 6, wherein the policy digest is stored in a memory location for a portal process and the daemon service initiates a connection to the portal process for retrieving the policy digest.

8. The method of claim 7, wherein the portal process is prevented from initiating a connection with the daemon service.

9. The method of claim 1, wherein prior to generating one or more calls to one or more system components, the policy digest is checked for adherence to the predefined format.

10. The method of claim 1, wherein controlling endpoint to endpoint connections comprises receiving connection escalation requests from endpoint agents and replying to the connection escalation requests with responses that include actions for handling connections that are based on the set of policies.

11. The method of claim 10, wherein a connection escalation request comprises a request from an endpoint agent running on a first endpoint of the enterprise network for approval to accept a connection request from a second endpoint and a response comprises an instruction to the first endpoint to accept or deny the connection request from the second endpoint of the enterprise network.

12. A system for protecting an enterprise network that is remote from the system, the system comprising one or more processors, memory, and one or more programs stored in the memory and executable by the one or more processors for:
controlling communications to and from the enterprise network according to a set of security policies;
controlling endpoint to endpoint connections within the enterprise network according to the set of security policies;
receiving a request for modifications to one or more policies of the set of policies;
automatically generating a policy digest formatted according to a predefined format, the policy digest comprising the modifications, and storing the policy digest in the memory;
retrieving the policy digest from the memory;
generating one or more calls to one or more system components that control the communications to and from the enterprise network and the endpoint to endpoint connections based on the policy digest; and
modifying control of the communications to and from the enterprise network and the endpoint to endpoint connections based on the one or more calls.

13. The system of claim 12, wherein the request for modifications is based on selections made by a user via a user interface.

14. The system of claim 12, wherein the communications for the enterprise network is routed through one or more perimeter points of presence and the one or more calls are one or more calls for modification of a security stack implemented by the one or more perimeter points of presence.

15. The system of claim 12, wherein the policy digest comprises one or more of an inbound network traffic policy modification, an outbound network traffic policy modification, and an internal network traffic policy modification.

16. The system of claim 12, wherein the policy digest is retrieved according to a predefined schedule.

17. The system of claim 12, wherein the policy digest is retrieved by a daemon service that generates the one or more calls to the one or more system components.

18. The system of claim 17, wherein the policy digest is stored in a memory location for a portal process and the daemon service initiates a connection to the portal process for retrieving the policy digest.

19. The system of claim 18, wherein the portal process is prevented from initiating a connection with the daemon service.

20. The system of claim 12, wherein prior to generating one or more calls to one or more system components, the policy digest is checked for adherence to the predefined format.

21. The system of claim 12, wherein controlling endpoint to endpoint connections comprises receiving connection escalation requests from endpoint agents and replying to the connection escalation requests with responses that comprise actions for handling connections that are based on the set of policies.

22. The system of claim 21, wherein a connection escalation request comprises a request from an endpoint agent running on a first endpoint of the enterprise network for approval to accept a connection request from a second endpoint and a response comprises an instruction to the first endpoint to accept or deny the connection request from the second endpoint of the enterprise network.

* * * * *

(12) INTER PARTES REVIEW CERTIFICATE (3869th)

United States Patent
Ammon et al.

(10) Number: US 10,826,941 K1
(45) Certificate Issued: Feb. 7, 2025

(54) SYSTEMS AND METHODS FOR CENTRALLY MANAGED HOST AND NETWORK FIREWALL SERVICES

(71) Applicants: Kenneth Ammon; Anurag Jain; Thomas Cross; Michael C. Starr

(72) Inventors: Kenneth Ammon; Anurag Jain; Thomas Cross; Michael C. Starr

(73) Assignee: FORTINET, INC.

Trial Number:

IPR2023-00030 filed Oct. 11, 2022

Inter Partes Review Certificate for:

Patent No.: 10,826,941
Issued: Nov. 3, 2020
Appl. No.: 16/023,388
Filed: Jun. 29, 2018

The results of IPR2023-00030 are reflected in this inter partes review certificate under 35 U.S.C. 318(b).

INTER PARTES REVIEW CERTIFICATE
U.S. Patent 10,826,941 K1
Trial No. IPR2023-00030
Certificate Issued Feb. 7, 2025

AS A RESULT OF THE INTER PARTES REVIEW PROCEEDING, IT HAS BEEN DETERMINED THAT:

Claims 1-22 are cancelled.

* * * * *